(12) United States Patent
Nonaka et al.

(10) Patent No.: US 7,269,798 B2
(45) Date of Patent: Sep. 11, 2007

(54) INFORMATION PROCESSING APPARATUS FOR PROJECT MANAGEMENT AND ITS COMPUTER SOFTWARE

(75) Inventors: Hisanori Nonaka, Tokai-mura (JP); Shigetoshi Sakimura, Hitachi (JP); Takeshi Yokota, Hitachi (JP); Kenji Araki, Mito (JP)

(73) Assignee: Hitachi, Ltd., Tokyo (JP)

( * ) Notice: Subject to any disclaimer, the term of this patent is extended or adjusted under 35 U.S.C. 154(b) by 602 days.

(21) Appl. No.: 10/391,616

(22) Filed: Mar. 20, 2003

(65) Prior Publication Data
US 2003/0179241 A1    Sep. 25, 2003

Related U.S. Application Data

(63) Continuation of application No. 10/339,320, filed on Jan. 10, 2003, now abandoned.

(30) Foreign Application Priority Data
Feb. 20, 2002    (JP)    ............................. 2002-43354

(51) Int. Cl.
*G06F 3/00*    (2006.01)
*G06F 3/14*    (2006.01)
(52) U.S. Cl. .................... 715/804; 715/764; 715/765; 715/835; 715/846; 715/511
(58) Field of Classification Search ............... 715/700, 715/705, 709, 711, 715, 763, 764, 781, 804, 715/810, 835, 837, 838, 846, 963, 765, 769, 715/511
See application file for complete search history.

(56) References Cited

U.S. PATENT DOCUMENTS

| | | | | |
|---|---|---|---|---|
| 5,428,729 A * | 6/1995 | Chang et al. | ................ | 715/751 |
| 5,535,422 A * | 7/1996 | Chiang et al. | ............... | 715/709 |
| 5,600,779 A * | 2/1997 | Palmer et al. | ............... | 715/709 |
| 6,002,396 A * | 12/1999 | Davies | ........................ | 715/763 |
| 6,469,723 B1 * | 10/2002 | Gould et al. | ................. | 715/837 |
| 2003/0041087 A1* | 2/2003 | Pothos et al. | ................ | 709/102 |

FOREIGN PATENT DOCUMENTS

JP    A-8-55067    2/1996

(Continued)

OTHER PUBLICATIONS

Thomas W. Shultz, "More Experiences with Microsoft PROJECT in Senior Design Classes", 1995, IEEE, pp. 2c3.8-2c3.11.*

(Continued)

*Primary Examiner*—X. L. Bautista
(74) *Attorney, Agent, or Firm*—McDermott Will & Emery LLP

(57) ABSTRACT

The information processing apparatus for project management comprises: a function of displaying on a screen a task area 12 where a symbol 123 representing a document relating to a task constituting a project is displayed; and a function of performing document work according to an operation instruction for the symbol 125 representing the document displayed in the task area 12. The task area 12 has a work area 121 which displays a symbol 123 representing the document, and an output area 122. When a symbol 126 representing a document is moved within the output area 122, the output area 122 displays a symbol representing the document in a task area of another associated task constituting the project.

21 Claims, 16 Drawing Sheets

FOREIGN PATENT DOCUMENTS

| | | |
|---|---|---|
| JP | A-9-114895 | 5/1997 |
| JP | 10-214113 | 8/1998 |
| JP | A-11-120247 | 4/1999 |
| JP | 11-282918 | 10/1999 |
| JP | 11-353369 | 12/1999 |
| JP | P2000-187695 A | 7/2000 |

OTHER PUBLICATIONS

"Microsoft Project 2000 Step by Step" by Carl S. Chatfield, PMP, and Timothy D. Johnson, MCP, Nikkei BP Soft Press of Japan, pp. 122-125, Oct. 9, 2000.

"Advanced Workflow Management system" by Haruo Hayami, Memoirs of Information Processing Society of Japan, vol. 39, No. 11, pp. 1160-1165, 1998.

Office Action dated Aug. 22, 2006 corresponding to Japanese Patent Application No. 2002-043354, in which the four prior art references cited herein were listed.

Tim Pyron et al., "Microsoft Project 2000" detailed commentary, Softbank Publishing Co., Ltd., Dec. 21, 2001, first edition, p. 29, pp. 583-586, pp. 635-740, p. 812 and p. 817, no traslation.

* cited by examiner

| WORK PACKAGE NAME | AREA CLASSIF-ICATION | DOCUMENT NAME | STORAGE LOCATION OF DOCUMENT | STATE |
|---|---|---|---|---|
| | | Ver.0 | C:¥Project01¥Task-B¥Ver.0.doc | R/W |
| WP02 | WORK AREA | Ver.1 | C:¥Project01¥Task-B¥Ver.1.doc | R/W |
| | | Ver.2 | C:¥Project01¥Task-B¥Ver.2.doc | R/W |
| | OUTPUT AREA | Ver.2-1 | C:¥Project01¥Task-B¥Ver.2-1.doc | R |

| WORK PACKAGE NAME | AREA CLASSIFICATION | DOCUMENT NAME | STORAGE LOCATION OF DOCUMENT | STATE |
|---|---|---|---|---|
| WP02 | WORK AREA | Ver.0 | C:¥Project01¥Task-B¥Ver.0.doc | R/W |
|  |  | Ver.1 | C:¥Project01¥Task-B¥Ver.1.doc | R/W |
|  |  | Ver.2 | C:¥Project01¥Task-B¥Ver.2.doc | R/W |
|  | OUTPUT AREA |  |  |  |

| WORK PACKAGE NAME | AREA CLASSIFICATION | DOCUMENT NAME | STORAGE LOCATION OF DOCUMENT | STATE |
|---|---|---|---|---|
| WP03 | WORK AREA | Ver.2-1 | C:¥Project01¥Task-B¥Ver.2-1.doc | R/W |
|  | OUTPUT AREA |  |  |  |

| CONNECTION PORT NUMBER | CONNECTED USER | CONNECTION STARTING TIME | CONNECTION TERMINAL NUMBER |
|---|---|---|---|
| 1 | ICHIRO TANAKA | 2001/9/1/7:00 | 133.144.155.2 |
| 2 | JIRO SUZUKI | 2001/9/9/9:00 | 133.144.155.5 |
| 3 | SABURO WATANABE | 2001/9/5/11:00 | 133.144.155.3 |
| : | : | : | : |

531g, 532g, 533g, 534g, 53g

| No. | OPERATOR | OPERAND |
|---|---|---|
| 1 | Send_to_Task | TASK D |
| 2 | Put_to_Folder | C:¥Data¥Common |
| 3 | Upload_to_Server | http://www.xxx.co.jp |
| 4 | Send_by_Mail | Tanaka@xxx.co.jp |
| 5 | Send_by_Fax | 029-283-XXXX |

FIG. 20

| WORK PACKAGE NAME (551k) | TARGET OF DISTRIBUTION (552k) | DISTRIBUTION TIME (553k) | TIME LIMIT (554k) | STATE (555k) |
|---|---|---|---|---|
| WP012 | ICHIRO TANAKA | 2001/9/1/12:22 | 2001/9/20/17:00 | COMPLETED |
| WP015 | ICHIRO TANAKA | 2001/9/2/9:13 | 2001/9/21/17:00 | BEING EXECUTED |
| WP022 | HAJIME YAMAMOTO | 2001/9/5/12:00 | 2001/9/20/17:00 | COMPLETED |
| WP034 | ICHIRO TANAKA | 2001/9/12/13:11 | 2001/9/30/17:00 | NOT STARTED |
| WP055 | SHOICHI KATO | 2001/9/15/12:45 | 2001/9/30/17:00 | BEING EXECUTED |

FIG. 21

| WORK PACKAGE NAME (551l) | TARGET OF DISTRIBUTION (552l) | DISTRIBUTION TIME (553l) | TIME LIMIT (554l) | STATE (555l) |
|---|---|---|---|---|
| WP012 | HISASHI OMURA | 2001/9/1/12:22 | 2001/9/20/17:00 | COMPLETED |
| WP015 | HISASHI OMURA | 2001/9/2/9:13 | 2001/9/21/17:00 | BEING EXECUTED |
| WP123 | MASAHIKO SAITO | 2001/9/5/9:00 | 2001/9/22/1200 | COMPLETED |
| WP034 | HISASHI OMURA | 2001/9/12/13:11 | 2001/9/30/17:00 | NOT STARTED |
| WP243 | KOICHI WATANABE | 2001/9/13/12:00 | 2001/10/1/9:00 | BEING EXECUTED |

INFORMATION PROCESSING APPARATUS FOR PROJECT MANAGEMENT AND ITS COMPUTER SOFTWARE

This application is a continuation of application Ser. No. 10/339,320 filed Jan. 10, 2003, now abandoned.

BACKGROUND OF THE INVENTION

The present invention relates to an information system which enables us to manage smoothly a construction project or a development project, and a work flow in daily operations. More specifically the present invention relates to a function of supporting management and exchange of various kinds of information relating to execution of the project and the work flow, its user interface method, a system for realizing this, and a device for realizing this.

In this connection, the project management mentioned in this specification means that information relating to execution of one or more operations (tasks) is properly managed, processed, and provided for the purpose of executing the tasks smoothly.

In addition, the information relating to execution of the tasks includes, for example, the following: resource information such as personnel, equipment, or costs, which are required for the execution of the task; time information such as work time, or scheduled starting/ending time; related information such as a document, data, or a URL (Uniform Resource Locator) corresponding to an Internet home page address, which should be referred to at the time of the execution; a purpose, and steps, of the execution; order relation with other tasks; and risk information relating to the tasks.

Moreover, in addition to a project of plant construction and a project of software development, the project management mentioned in this specification includes wider concepts, for example, execution management of daily operations, and management of a work flow which is in particular a chain of fixed operations.

As a tool used for project management which lays emphasis on circulation of a document as described above, there is known a workflow system describe in, for example, "Advanced Workflow Management system" by Haruo HAYAMI, Memoirs of Information Processing Society of Japan, Vol. 39, No. 11, pp. 1160-1165, 1998.

Nevertheless, it was difficult for the technique to manage tasks and related information such as documents synthetically while realizing data association between tasks.

SUMMARY OF THE INVENTION

In view of the foregoing, the present invention has been made, and an advantage of the present invention is to provide an information processing apparatus for project management and computer software which synthetically support management of information relating to tasks in a project, and relating to execution of the tasks.

The project management method according to the present invention is executed as follows. In a project having one or more tasks, an arbitrary task in the project is associated with a first display area and a second display area, which display a symbol (hereinafter, referred to as "icon") representing data and a file relating to the task. A user copies, edits, and deletes the data and the file in the first display area. In addition, the second display area is associated with another task in the project. Moving the symbol, which represents the file displayed in the first display area of the task, to the second display area of the task permits a symbol representing the file to be additionally displayed in the first display area of said another task which is associated with the second display area.

According to an aspect of the present invention, there is provided an information processing apparatus for project management comprising: a function of displaying, on a screen, a task area used to display symbols, wherein the symbols represent a document relating to at least one task constituting a project and task, respectively; and a function of performing document work according to an operation instruction for the symbol representing the document displayed in the task area; wherein the task area has a work area where a symbol representing a document of a task and a symbol representing task other than output work are displayed, and an output area; and wherein the output area displays, in the output area of the task area on the screen, a symbol representing a document in a task area of another associated task constituting the project when the symbol representing the document is moved within the output area.

Preferably, the task area displays a revision history of the document represented by the symbol, the move operation of which has been performed, and displays an associated destination.

Preferably, the apparatus further includes a function that enables a user to open, edit, save, copy, and delete a document according to an operation instruction for a symbol representing the document displayed in the work area and the output area.

Preferably, the apparatus further includes a function of creating a new document and a symbol representing the new document according to a given operation instruction in the work area.

Preferably, the apparatus further includes a function of transmitting a file, which has been moved to the output area, to an address, a folder, or a database, which have been specified for this area beforehand.

Preferably, the work area has a reference area which displays a symbol representing a document for reference only, and a general work area which displays a symbol representing the other documents.

Preferably, the apparatus has an independent guidance area for displaying guidance about execution steps of the task.

Preferably, the apparatus has a display area for displaying a symbol hyperlinked to a file, a database, or a home page, which should be referred to when executing the task.

Preferably, the apparatus includes a function of displaying a task in a project as a progress schedule chart such as a Gantt chart or an arrow diagram, where selecting an arbitrary task on the progress schedule chart permits a work area and an output area, which are associated with the task, to be displayed.

Preferably, the apparatus includes a function of distributing a document and an icon relating to a task, data in a display area, and a function of the data operation, as unified object data.

Preferably, the apparatus includes a function by which when the work for the distributed object data is started, the information processing apparatus for project management, which has distributed the object data, is notified of the starting of the work.

Another aspect of the present invention, there is provided computer software used for an information processing apparatus for project management, the information processing apparatus for project management comprising: a function of displaying, on a screen, a task area used to display symbols, wherein the symbols represent a document relating to at least one task constituting a project and task, respectively; and a function of performing document work according to an operation instruction for the symbol representing the document displayed in the task area; wherein the task area has a work area and an output area; and wherein said computer software includes a program allowing a computer to display, in the work area of the task area on the screen, a symbol representing a document of a task and a symbol representing task other than output work, and to display, in the output area of the task area on the screen, a symbol representing a document in a task area of another associated task constituting the project when the symbol representing the document is moved within the output area.

(1) According to the present invention, a task and its related documents can be managed while associating the task with the related documents. To be more specific, in the first display area which is associated with the task, a user can perform processing for a document relating to the task. Assuming that an icon of a file relating to the task is displayed in the first display area, it is possible to perform the following file operation: opening a file corresponding to this icon to edit its contents according to given steps; copying this icon to create a copy of the file; deleting this icon to delete the file; changing a name of this icon to rename the file; and the like. This enables the user to collectively manage files relating to the task in the first display area. Accordingly, the user can be free from complex management, and can avoid an accident caused by the complex management. As opposed to this, if a user conventionally manages files on the basis of his/her own judgment, the following problems arise: while working with documents relating to a task in a folder, the user becomes confused about the correspondence of the folder and the task; the user becomes confused about a location of the folder itself; the user deletes the folder by mistake; and the like.

(2) According to the present invention, information relating to a task can be managed collectively. To be more specific, not only the documents to be processed, but also icons which correspond to information relating to the task, are displayed in the first display area. In this case, for example, the information relating to the task includes the following: resource information, such as personnel, equipment, or costs, which are required for the execution of the task; time information such as work time, scheduled starting time, or scheduled ending time; related information such as a document, data, or URL (Uniform Resource Locator) corresponding to an Internet home page address, which should be referred to at the time of the execution; a purpose, and steps, of the execution; order relation with other tasks; and risk information relating to the tasks. Thus, a task and its related information can be managed collectively while associating the task with the related information. Therefore, it is possible to solve the following problems which conventionally confronted the user: management of association between a document and related information requires much labor; and the number of mistakes which accompanies the management increases.

(3) According to the present invention, it is possible to pass a document between tasks easily. For example, moving a final version document, which has been created in the first display area associated with a task A, to the second display area of the task permits the document to be automatically sent to the first display area of another task which is associated with the second display area. This enables the user to perform document exchange between tasks using an integrated interface, which improves usability.

BRIEF DESCRIPTION OF THE DRAWINGS

FIG. 7 is a diagram illustrating another example of work package data in the project management/support system according to the first embodiment;

FIG. 9 is a diagram illustrating another example of work package data in the project management/support system according to the first embodiment;

FIG. 12 is a diagram illustrating an example of connected user information in the project management/support system according to the second embodiment;

FIG. 20 is a diagram illustrating an example of To-Do list data in the project management system according to the fourth embodiment;

FIG. 21 is a diagram illustrating another example of To-Do list data in the project management system according to the fourth embodiment.

DESCRIPTION OF THE PREFERRED EMBODIMENTS

Preferred embodiments of the present invention will be described.

Embodiments of an information processing apparatus for project management according to the present invention will be described with reference to FIGS. 1 through 22.

In the first place, a first embodiment will be described. A system exemplified in this embodiment, which is one of information processing apparatus for project management, is intended for supporting the management and implementation of a project. The system comprises two functions: one displays on a screen a task area where a symbol representing a document relating to at least one task constituting a project and a symbol representing task are displayed; the other performs document work according to an operation instruction for the symbol representing the document displayed in the task area. The task area has a work area and an output area. The work area displays a symbol representing a document of a task and a symbol representing task other than output work. The output area displays a symbol representing a document in a task area of another associated task constituting the project when a symbol representing a document is moved within the output area.

Figure 1:
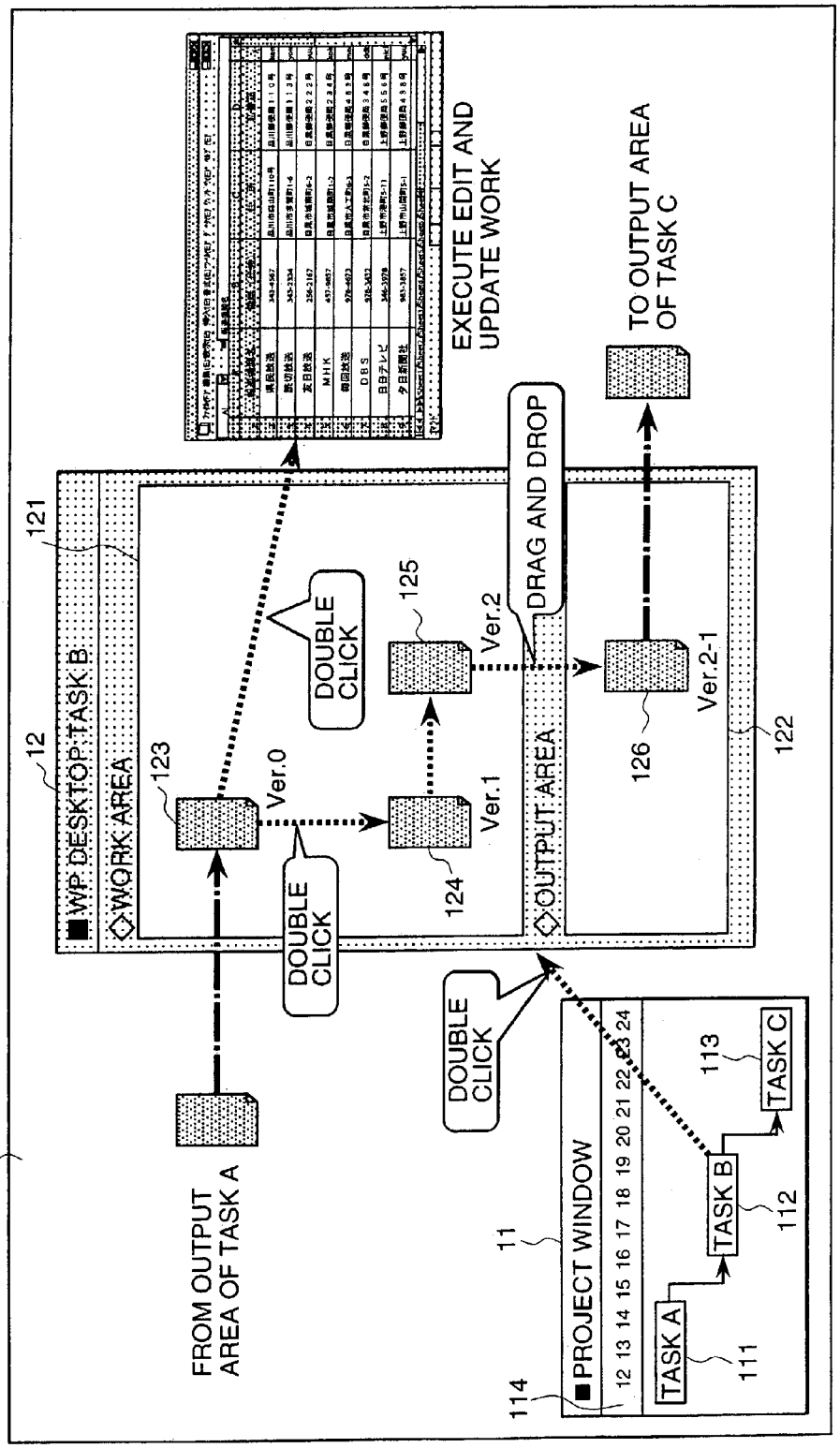
FIG. 1 is a diagram illustrating an example of a screen provided by a project management/support system according to a first embodiment of the present invention.

FIG. 1 illustrates an example of a screen provided by a project management/implementation support system according to this embodiment. FIG. 1 is a diagram illustrating two windows which play central roles according to this embodiment. In order to simplify the description, hereinafter these windows are referred to as a project window 11 and a work package window 12. It is to be noted that in the figure, a broken line is an additional line for illustrating document transition and screen transition by user operation, and a dash-dot line is an additional line for illustrating a state of document transition by automatic processing.

In the beginning, the project window 11 is displayed in a display 1 of a user. The project window 11 allows the user to glance at tasks of a project to be managed. The project window 11 displays at least a list of task names, and more preferably displays a Gantt chart or a network chart where rectangles 111 to 113, each of which corresponds to a task, are placed along a time base.

FIG. 1 illustrates relationships among three tasks (task A, task B, and task C in the order of progressing execution time) in a Gantt chart format in which a horizontal axis of a screen is a time base 114. In addition, arrows which connect the tasks in FIG. 1 represent a relationship of task execution order as follows: when the task A is completed, the task B is executed; when the task B is completed, the task C is executed. Incidentally, a display format of the project window 11 is not limited to the display format of the embodiment in FIG. 1 insofar as a publicly known project management chart can be displayed.

In FIG. 1, when a user designates the rectangle 112 corresponding to the task B, the work package window 12 corresponding to the task B is displayed. To be more specific, possible designating methods are as follows: a user moves a mouse cursor to the rectangle 112, and then double-clicks the rectangle 112; a user single-clicks the rectangle 112 to select it, and then presses an Enter key from a keyboard. If it is possible to identify operation for opening the work package window 12 corresponding to the rectangle 112, other methods also can be used instead.

Moreover, when opening a work package window of an arbitrary task, if the execution authority of the task is authenticated, the information security of a system can be increased. The authority authentication processing may be performed by a method which uses a password or an ID card, as well as by the use of an existing means suffices. In the present invention, the authority authentication processing is not limited in particular.

In this embodiment, the inside of the work package window 12 is further divided into a work area (work area) 121 and an output area (output area) 122. The work area 121 is an area where a user manages and operates documents relating to the corresponding task. In this area, the user can perform at least the following operation: create, open, edit, copy, save, and delete, of the documents.

In FIG. 1, at the beginning, an icon 123 of a document having a name "Ver. 0" is given to the work area 121 of the work package window 12 of the task B. By using the same method as that used when the user designates the rectangle 112 corresponding to the task B, designating the icon 123 permits a document corresponding to the icon 123 to be opened, whereby the user can refer to, edit, and save contents, etc. A window 13 is an example in which an address book created by Excel (developed by Microsoft Corp. in the United States) as spreadsheet software is opened as the document corresponding to the icon 123. Thus, a document relating to a task is not necessarily required to be created by dedicated software for a proposal system according to the present invention. The document may also be created by general commercial software. This enables management while associating a task with a document, which improves the usability of task management.

In addition, the document placed in the work area 121 is not necessarily required to be created in this area. A document which has been copied from an outside document storage using general copy operation may also be used. Moreover, a plurality of documents, or two or more kinds of documents, can also be placed in the work area 121 at the same time.

The embodiment in FIG. 1 illustrates a state in which a document "Ver. 0" is revised and is then saved using a name of "Ver. 1", and in which the document "Ver. 1" is further revised and is then saved using a name of "Ver. 2". As a result, in the work area 121, an icon 124 of the document having the name of "Ver. 1" and an icon 125 of the document having the name of "Ver. 2" are displayed in addition to the icon 123 of the document having the name of "Ver. 0".

Moreover, although the document is expressed in an icon form in FIG. 1 placing emphasis on easiness of intuitive understanding, other methods of expression may also be used. For example, a document name, creation time, capacity, and the like, can also be displayed in tabular form. In this case, as compared with the indication with icons, more information about a document can be displayed, which is a recognized merit. Furthermore, if the document can be sorted in order of name, creation time, capacity, or the like, it is more suitable for the management of documents.

Next, the output area 122 of the work package window 12 will be described. In this embodiment, the output area 122 is an area having a function of sending the document that has been created by the task to another given task.

In the embodiment shown in FIG. 1, a case where the document "Ver. 2" created in the work area 121, which is treated as the final presented version, is sent to the task C (rectangle 113), which is the next task of the task B (rectangle 112), will be described.

Here, a user designates the icon 125 of the document having the name "Ver. 2", which exists in the work area 121, and then moves the icon 125 to the output area 122. To be more specific, possible operation methods are as follows: moving the icon 125 by mouse cursor operation called drag and drop; single-clicking the icon 125 before inputting a command corresponding to "move to an output area". However, other methods can also be used instead insofar as it is possible to specify move operation for moving the icon 125 to the output area 122.

As soon as the icon 125 is moved to the output area 122 by the-above-mentioned method, the system according to this embodiment automatically sends the document "Ver. 2" corresponding to the icon 125 to the task C. To be more specific, an icon 126 corresponding to the document "Ver. 2" is additionally displayed (not shown) in a work area of a work package window corresponding to the task C. Here, as is the case with the "Ver. 0" performed in the work area 121 of the task B, the operation for "Ver. 2" including open, edit, copy, delete, sort, and the like becomes possible.

Returning to the document "Ver. 0", not only a document newly created in this area and a document copied from an outside document saving area, but also a document transferred from the task A (rectangle 111) which is precedent to the task B. may also be used as the document "Ver. 0" displayed as the icon 123 in the work area 121 of the task B.

According to this embodiment, the user can manage (create, edit, save, delete) a document relating to a specific task in a unified display area, i.e., a work area. In addition to it, the user can pass the document to another task only by move operation for moving the document to the output area. This enables an improvement in efficiency of document management relating to a task.

Figures 2, 3:
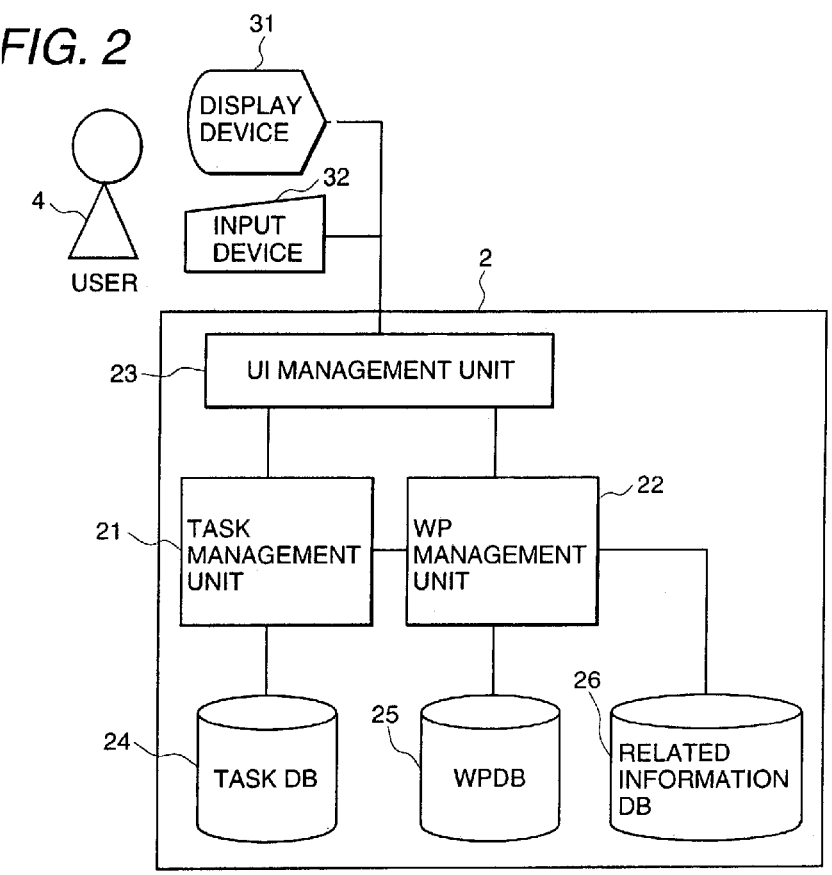
FIG. 2 is a diagram illustrating a functional configuration of the project management/support system according to the first embodiment.
FIG. 3 is a diagram illustrating an example of task data in the project management/support system according to the first embodiment.

A functional configuration of the system according to the first embodiment will be described below. FIG. 2 is a diagram illustrating a functional configuration of the project management/implementation support system 2 according to the first embodiment. The project management/implementation support system 2 includes a computer, and comprises three functional units, that is, a task management unit 21, a work package (WP) management unit 22, and user interface (UI) management unit 23; and three databases, that is, a task database (DB) 24, a work package database (WPDB) 25, and related information database (DB) 26.

The task management unit 21 is a part used for managing data relating to the names of individual tasks in a project, its execution time, and the like. An entity of the data is stored in the task DB 24.

The work package management unit 22 is a part used for managing data relating to work packages corresponding to individual tasks. An entity of data is stored in the WPDB 25 and the related information DB 26.

The user interface management unit 23 has the following functions: converting information, which is managed by the task management unit 21 and the work package management unit 22, into data used for displaying, and then displaying the converted data in the display device 31; and processing the data, which has been inputted by a user 4 through an input device 32, and then distributing the processed data to the task management unit 21 or the work package management unit 22.

The processing units and the databases will be individually described in detail below. To begin with, a data configuration (task DB 24) will be described. FIG. 3 illustrates an example of a data structure of task data 51 stored in the task DB 24. In this example, each task has the following attribute items: a task name 511, a performer 512, scheduled starting time 513, scheduled ending time 514, a work package name 515, a subsequent task name 516.

For example, the task data 51 in FIG. 3 shows the following: a performer of the task A is Ichiro Tanaka; scheduled starting time of the task A is 8:00 a.m., Sep. 1, 2001; scheduled ending time is 5:00 p.m., September. 2, which is the next day; a name of a work package corresponding to the task A is WP01; and a subsequent task is the task B. In this case, a plurality of performers 512 and a plurality of subsequent task names 516 may also be set.

The data includes at least information required for displaying the project window 11 shown in FIG. 1. Besides the information, the data includes information such as a performer of a task, and a name of a corresponding work package.

In addition to the attribute items shown in FIG. 3, attribute items that are peculiar to a task can also be added to the task data 51. For example, the following attribute items can be added: the kind and importance of a task; the kind and quantity of a resource required for execution; colors and lines for displaying; numbers representing the order of displaying; and the like.

On the basis of task information shown in FIG. 3, which is managed by the task management unit 21, the user interface management unit 23 creates data used for displaying a project window, and then displays the data in the display device 31.

Figures 4, 6:
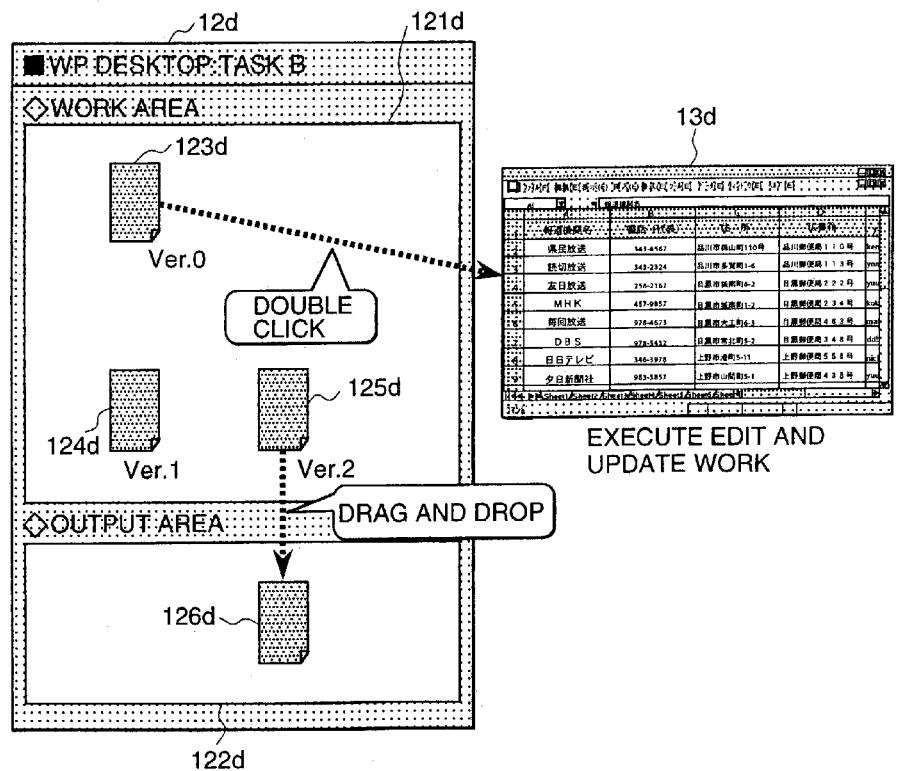
FIG. 4 is a diagram illustrating an example of work package data in the project management/support system according to the first embodiment.
FIG. 6 is a diagram illustrating an operation example of a work package desktop in the project management/support system according to the first embodiment.

A data configuration (WPDB 25) will be described. FIG. 4 illustrates an example of a data structure of a work package data 52 (corresponding to a work package WP02) which is stored in the WPDB 25. In this example, each work package has the following attribute items: a work package name 521; area classification 522; a document name 523; a storage location 524 of a document entity; and a state of document 525.

In this connection, as shown in FIG. 3, the work package WP02 is a work package which corresponds to the task B. Moreover, contents represented by the work package data 52 correspond to the work package window 12 shown in FIG. 1.

The data is information used for indicating how a work package is associated with related information such as documents. If this purpose is satisfied, a data structure other than that shown in FIG. 4 may also be used.

Referring to FIG. 4, the following is found out: the work package WP02 includes a work area and an output area as the area classification 522; as shown in the document name column 523, the work area includes three documents names ("Ver. 0", "Ver. 1", and "Ver. 2"); and the output area includes a document name "Ver. 2-1". In addition, in the document storage location column 524, a logic name representing the entity or storage location of each document is described; that is to say, a logical location of the related information DB 26 in FIG. 2 is described. For example, an entity of a document having a document name "Ver. 0" is "C:¥Project01¥Task-B¥Ver.0.doc". This indicates a document having a logical name "Ver.0. doc" which exists in a subfolder Task-B under a folder Project01 in a drive having a logical name "C" from among storage devices of a computer.

In this case, notation for document logical names, which is found in the well-known operating system developed by Microsoft, is used as an example. However, the logical names may also be described using different notation, the purpose of which is the same.

Figure 5:
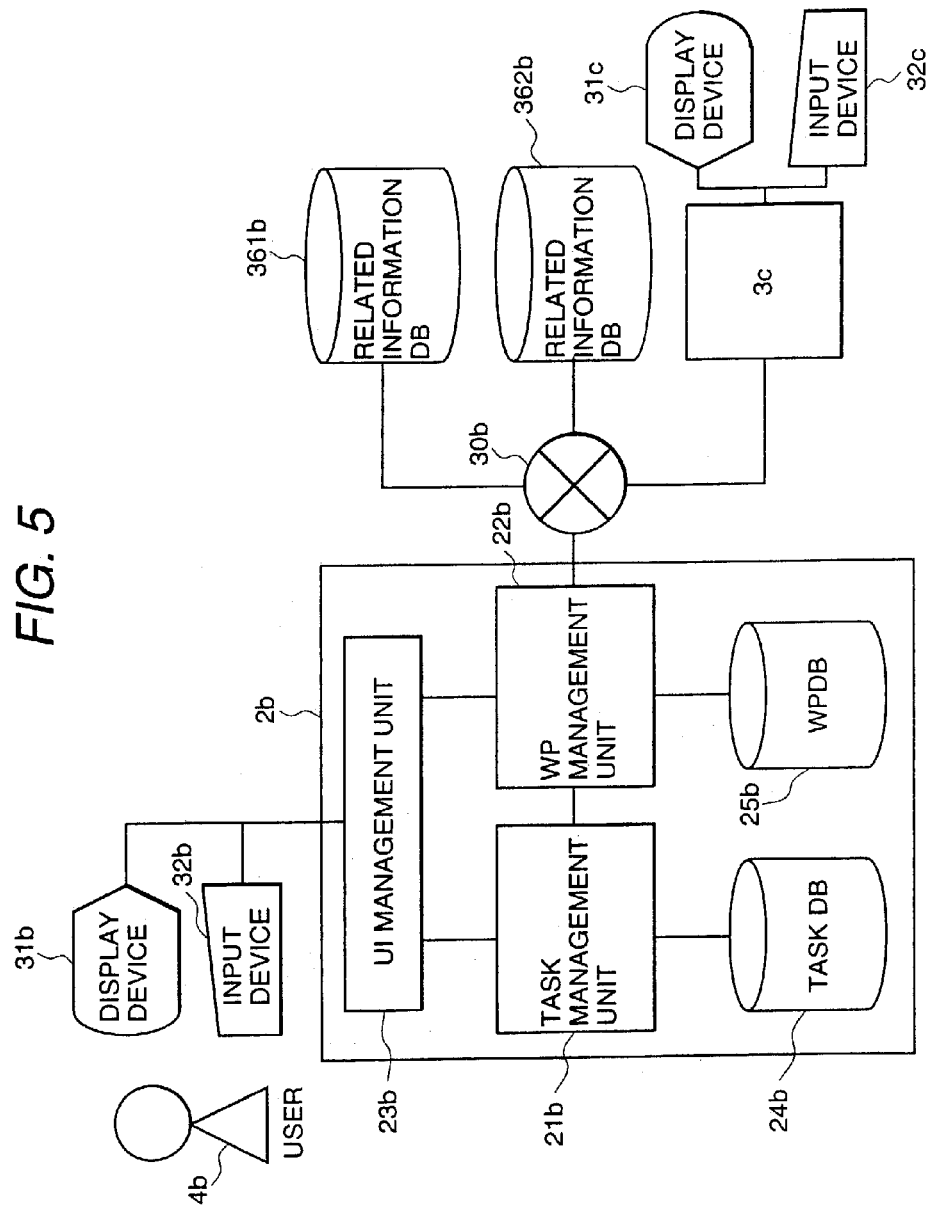
FIG. 5 is a diagram illustrating another example of a functional configuration of the project management/support system according to the first embodiment.

Moreover, if a logical identification is possible, as shown in FIG. 5, the entity of the related information DB 26 may also be provided in a distributed manner. In this case, the distributed entities can be utilized via a network 30b. If the entity of the document is distributed on the network, the project management/implementation support system 2b is not required to have an internal (local) storage device, which simplifies the system device. In addition, sharing the related information databases 361b, 362b with another project management/implementation support system 3c enables the unification of data, and thereby an operation such as the maintenance of the latest data can be performed efficiently.

In order to attain a similar object, the entities of the task DB 24b and the work package DB 25b may also be distributed on the network in such a manner that the entities can be logically managed collectively.

Moreover, in the state column 525 in FIG. 4, a state of document management corresponding to each line is described. Here, "R/W" indicates that a corresponding document can be read and written (Read/Write); and "R" indicates that only reading (Read) is possible. In this case, a policy is assumed of forbidding a document moved from the work area to the output area to be revised as the final version. Besides, although detailed information about reading authority and writing authority can be added, the present invention does not limit this method.

The user interface management unit 23 in FIG. 2 draws the work package window 12 as shown in FIG. 1 according to the work package data 52 in FIG. 4. To be more specific, the user interface management unit 23 draws the icons 123 through 125, which correspond to the document names "Ver. 0", "Ver. 1", and "Ver. 2", respectively, in the work area 121; and the user interface management unit 23 draws the icon 126, which corresponds to the document name "Ver. 2-1", in the output area 122.

Processing at the time of an icon operation will be described. Referring next to FIGS. 6 and 7, processing of a system performed when a user operates an icon on the work package window will be described. FIG. 6 illustrates: the work package window 12d which has the work area 121d displaying three icons 123d through 125d, and an output area 122d displaying an icon 126d; and the window 13d displaying an icon 123d. FIG. 7 illustrates work package data 52d corresponding to FIG. 6.

Here, when a user, for example, double-clicks the icon 123d of "Ver. 0" on the work area 121d, the user interface management unit 23 notifies the work package management unit 22 of the operation. The work package management unit 22 refers to the work package data 52d in FIG. 7, and thereby finds out that a storage location of a document corresponding to "Ver. 0" in the work area is "C:¥Project01¥Task-B¥Ver.0.doc". Then, the work package management unit 22 performs open operation for opening this document. To be more specific, the work package management unit 22 issues a command to the operating system, requesting the operating system to open "C:¥Project01¥TaskB¥Ver.0.doc". As a result, the screen 13d corresponding to "Ver. 0" In this embodiment, an edit operation and an update operation after the screen 13d is opened depend on each application.

Figure 8:
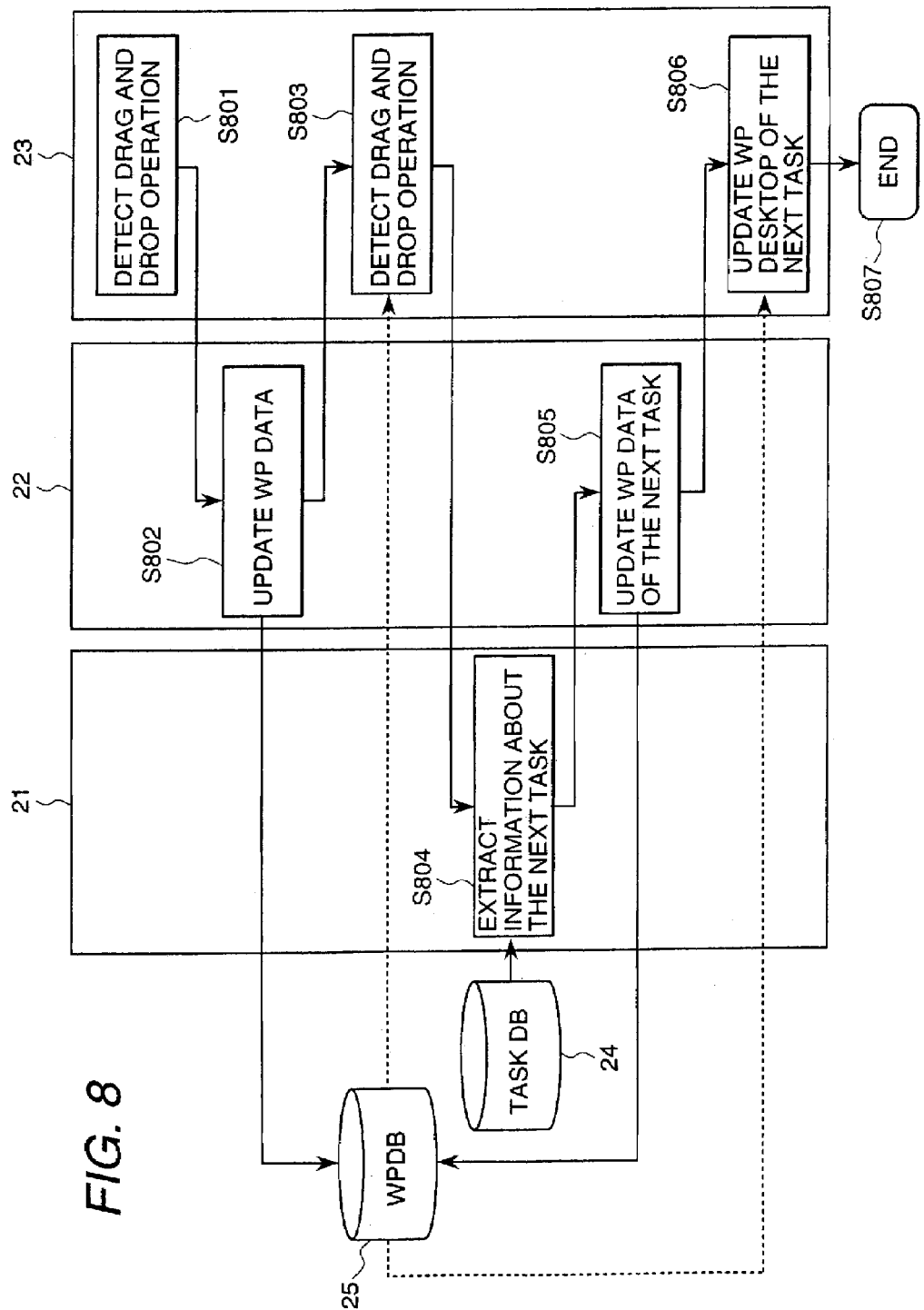
FIG. 8 is a diagram illustrating an example of a process flow in the project management/support system according to the first embodiment.

Next, processing performed when a user drags the icon 125d of "Ver. 2" in the work area 121d and drops it at a position of the icon 126d in the output area 122d will be described. FIG. 8 is a flowchart illustrating processing procedures of this case. In the figure, solid line arrows indicate a process flow; and dotted line arrows indicate a data flow. In the figure, a step S804 indicates processing in the task management unit 21; steps S802 and S805 indicate processing in the work package management unit 22; and steps S801, S803, and S806 indicate processing in the user interface management unit 23.

In the first place, when drag and drop operation is performed, the user interface management unit 23 detects the operation, and then notifies the work package management unit 22 of the operation (step S801). The work package management unit 22 refers to the work package data 52d of the task stored in the WPDB 25, and thereby finds out that a storage location of a document corresponding to "Ver. 2" in the work area is "C:¥Project01¥Task-B¥Ver.2.doc". Then, the work package management unit 22 creates its copy and saves the copy in the document storage location column 524d as "C:¥Project01¥Task-B¥Ver.2-1. doc". At the same time, the document name 523d is provided with "Ver. 2" and the state 525d is provided with "R" in order to inhibit the revision of the document (step S802). As a result of the processing described above, the work package data in FIG. 7 is altered into the work package data in FIG. 4. Moreover, in response to the alteration of the work package data, the user interface management unit 23 draws the work package window again (step S803). Finally, a screen of the work package window 12 in FIG. 1 is presented to the user.

Subsequently, by treating the alteration of the work package data of the project as a trigger, a document which has been moved to the output area is sent to the next task. In the first place, with reference to the task data 51 stored in the task database 24 of the project, the following are extracted: a subsequent task of the task B is the task C; and a work package name corresponding to the task C is WP03 (step S804). Next, a name "Ver. 2-1" of the document to be moved in this embodiment is written into a document name column 523e of the work area of the work package data 52e (refer to FIG. 9) which corresponds to WP03 stored in the work package database 25; "C:¥Project01¥Task-B¥Ver.2-1.doc" is written into a document storage location column 524e; and "R/W" is written into a state column 525e (step S805). Finally, if the work package window of the task C is opened, an icon of a document having a name "Ver. 2-1" is drawn in a work area (step S806) according to overwritten work package data 52e.

As a result, the user can pass the document to an appropriate task only by dragging and dropping the icon of the document to the output area. This enables a decrease in labor required for circulation of the document.

In addition, if a screen of the task C is not opened, the possible processing as the processing of the step S806 are as follows: automatically opening a work package desktop corresponding to the task C; and notifying a user of this matter by means of a screen, sound, or an on-and-off light. This enables the user to know immediately that the document has been passed, and to know immediately of information about related tasks, which are recognized merits.

Figure 10:
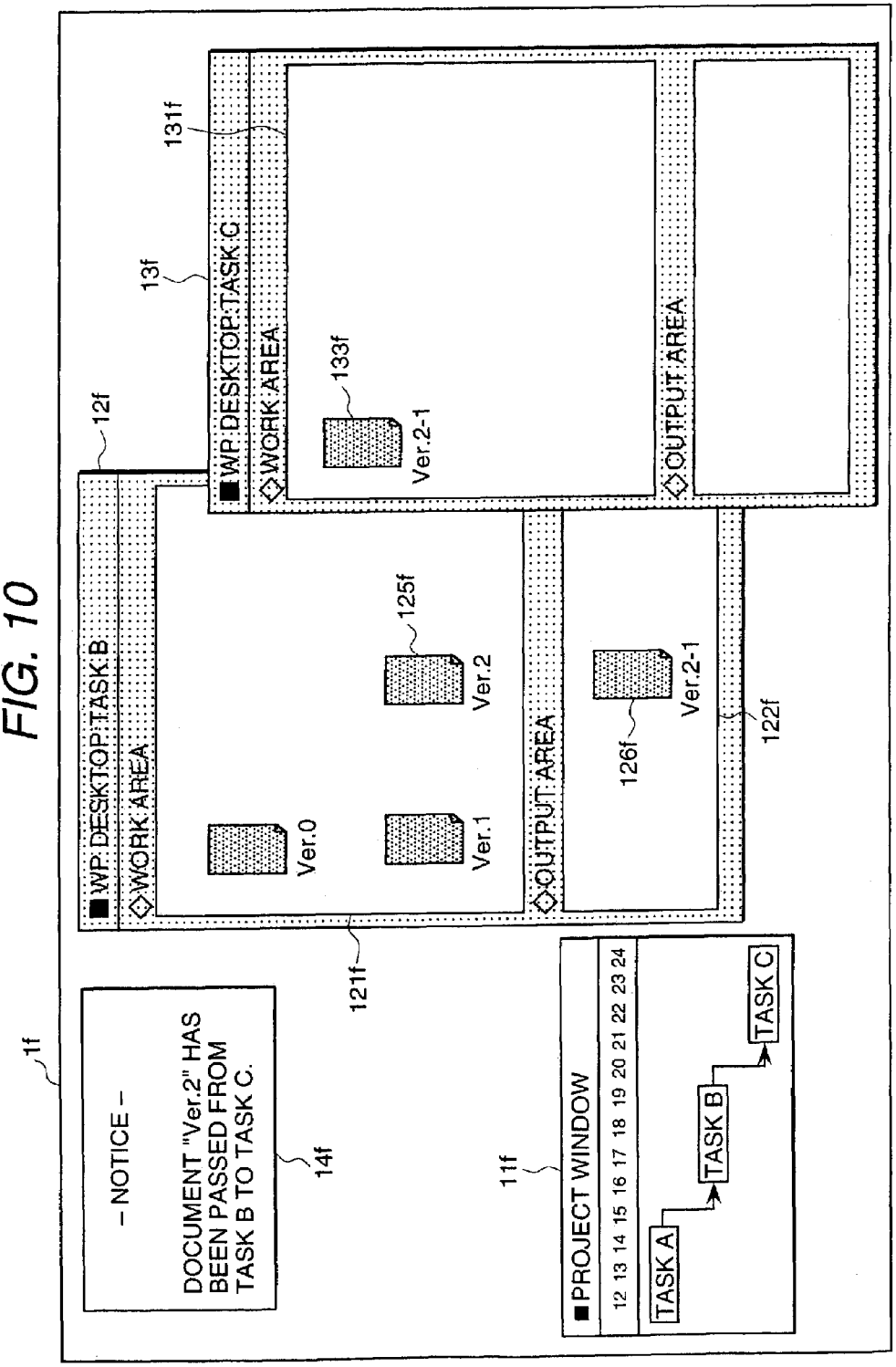
FIG. 10 is a diagram illustrating another example of a project management screen in the project management/support system according to the first embodiment.

FIG. 10 illustrates an example of a screen which is finally provided as a result of the processing described above. FIG. 10 illustrates a state in which in the work package desktop if of the task B, the icon 125f of "Ver. 2" is dragged from the work area 121f, and is then dropped into the output area 122f, with the result that a work package desktop 13f of the task C and a warning dialogue 14f have opened automatically. Moreover, although the icon 131f of "Ver. 2-1" is displayed in the work area 131f of the task C, an entity of this document is the same as that of a document corresponding to the icon 126*f* of "Ver. 2-1" in the output area 122*f*; that is to say, the entities are "C:¥Project01¥Task-B¥Ver.2-1.doc".

As described in the above-mentioned embodiment, the project management/implementation support system according to the present invention can execute operations (such as create, edit, copy, and delete of a document relating to a task) in a work package desktop window which is associated with the task. This enables an improvement in the usability of document management. In addition, it is possible to pass a document between related tasks easily by drag and drop operations.

A second embodiment will be described. This embodiment is an example of association among a plurality of users or tasks, which will be described below. FIG. 1 illustrates a functional configuration of a project management/implementation support system 2*g* according to this embodiment. This embodiment is based on the assumption that a plurality of users (in FIG. 11, there are two persons 4*g*, 4*h*) establish connections to a user interface management unit 23*g* via a network 30*g*. For example, a possible specific embodying means of the network 30*g* is a dedicated cable such as RS232C, a dedicated LAN, or the Internet. However, the means is not limited in particular here.

This configuration has the advantage that the plurality of users can share information about a project, a task, and a work package at their respective different locations simultaneously.

Moreover, providing the user interface management unit 23*g* with a user management function permits a work package desktop of an arbitrary task to be disclosed only to a user relating to the task.

Figures 11, 15:
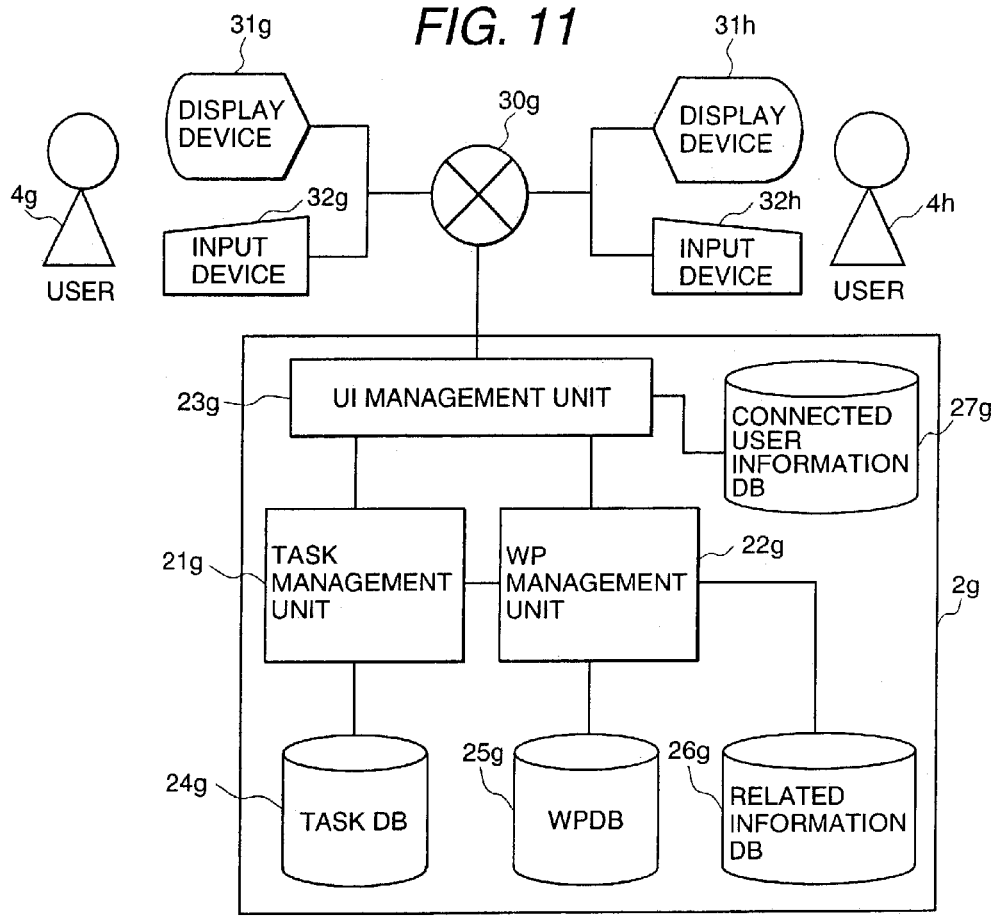
FIG. 11 is a diagram illustrating a functional configuration of a project management/support system according to a second embodiment.
FIG. 15 is a diagram illustrating an example of a command list of document processing in the project management/support system according to the second embodiment.

A connected user information database (DB) 27*g* in FIG. 11 stores data for managing users who are connected to the user interface management unit 23*g* via the network 30*g*.

FIG. 12 illustrates an example of connected user information 53*g* stored in the connected user information DB 27*g*. Here, a connection port number column 531*g* describes a logical data port number for connection by a user; a connected user column 532*g* describes a name of a connected user; a connection starting time column 533*g* describes time when a user has started connection; and a connection terminal number column 534*g* describes a terminal number of a terminal used for connection by a user. In FIG. 12, it is found out that, for example, Mr. Ichiro Tanaka has started a connection from a connection terminal having a number 133.144.155.2 to a connection port number 1 at 7:00 on Sep. 1, 2001. Moreover, a user who is not described in the connected user information 53*g* represents a user who is not connected at present.

Figure 13:
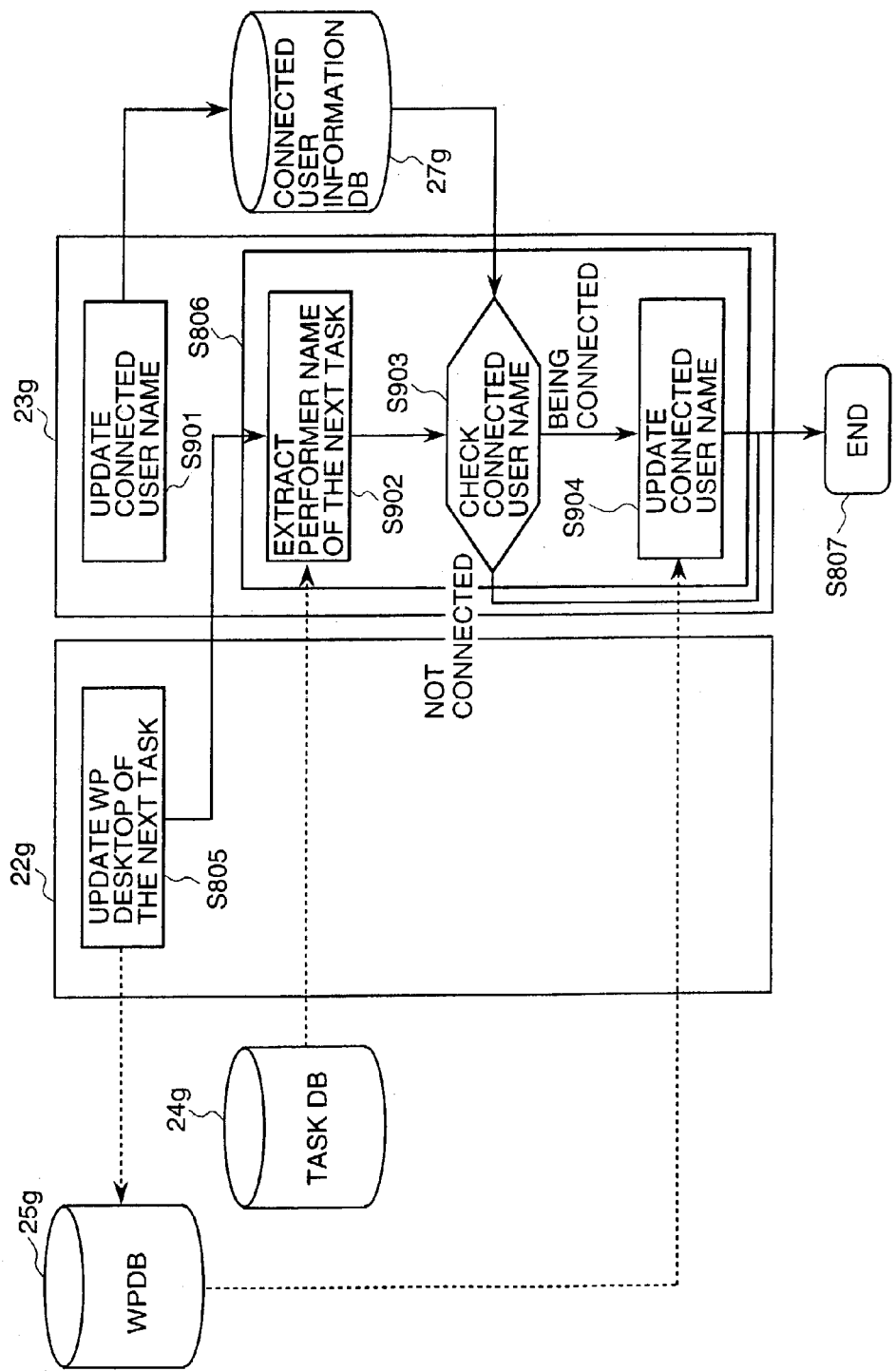
FIG. 13 is a diagram illustrating an example of a process flow in the project management/support system according to the second embodiment.

FIG. 13 illustrates a process flow for managing a plurality of users in the user interface management unit 23*g*. Here, processing procedures after the step S805 in FIG. 8 will be described. To be more specific, when the work package data of the next task (in this case, the task C) is updated in the step S805, the update is treated as a trigger to extract a performer name of the task from the task DB 24*g* in step S902. In this case, "Saburo Watanabe" is obtained from the task data 51 in FIG. 3 as the performer name of the task C. Next, in step S903, the performer name "Saburo Watanabe" is compared with the connected user information 53*g* stored in the connected-user information database 27*g*. As a result, it is found out that Saburo Watanabe has started a connection from a connection terminal having a number 133.144.155.3 to a connection port number 3 at 11:00 on Sep. 5, 2001, and that the connection still continues now. As next processing, if the connection still continues, a work package desktop corresponding to the task is updated in step S904; or if a work package is not opened, the work package is automatically opened.

Incidentally, the connected user name update processing S901 carries out the following: when an arbitrary user establishes a connection to the user interface management unit 23*g* via the network 30*g*, authentication of the user is performed; and if the user is authenticated, the connected user information 53*g* is updated. The use of an existing authentication means is sufficient for the authentication processing. In the present invention, the authentication processing is not limited in particular.

As a result of the processing described above, as shown in FIG. 14, an icon 126*g* of "Ver. 2-1" in the output area 122*g* of the work package desktop 12*g* of the task B by a user 4*g* (Mr. Jiro Suzuki) is placed, and thereby information about this is allowed to pass through the network 30*g* and the project management/implementation support system 29. Consequently, an icon 123*h* of "Ver. 2-1" is automatically displayed in a work area of the work package desktop 12*h* of the task C, which is opened by a user 4*h* (Mr. Saburo Watanabe) as a performer of the task C.

This permits a document that has been processed by a task performer in a work package desktop of an arbitrary task to be automatically distributed to a performer of the next task, which enables smooth operations association among a plurality of users.

Destination setting of an output area will be described. In the embodiment described above, a document is passed between tasks through the task database and the work package database, which are logically unified. However, in the present invention, a method for passing a document between tasks is not limited in particular. For example, a document may also be passed using electronic mail or a messaging means in peer-to-peer environment. For example, if electronic mail is used, an output area is associated with an e-mail address indicating beforehand a performer of a task, or a personified task, as a destination of a document. In step S804 in FIG. 8, e-mail address is obtained from the task DB 24. Then, a document created by a task performer is sent to the e-mail address. In step S805, as operation that is carried out here, the next task receives the document by electronic mail, and then updates corresponding work package data.

The present invention can be executed in a network environment, where online continuous connection is not available, by passing a document using electronic mail or the messaging means in peer-to-peer environment.

Additionally, among the documents created in the work package desktop, some are transmitted to the next task, others are required to be stored (posted) in a given storage location (for example, in a bulletin board system or in a shared folder), or required to be sent to a given individual by electronic mail or facsimile. For this reason, it is desirable that processing for the document can be set while associating the processing with the output area.

FIG. 15 illustrates an example of a list 54*g* of processing commands for the document, which are set while associating the processing commands with the output area. The processing command list 54*g* has the following columns: a number column 541*g* indicating a reference number of a processing command; an operator column 542*g* representing a processing command name for a document; and an operand column 543*g* representing a variable value processed by a command.

In the processing command list 54*g*, for example, an operator "Send_to_Task" instructs that a document should be automatically sent to a work area of a task "task D" specified by an operand; an operator "Put_to_Folder" instructs that a document should be output to a shared folder "C:¥Data¥Common" specified by an operand; an operator "UPload_to_Server" instructs that a document should be output to a bulletin board system "http://www.xxx.co.jp/xxx.html/" specified by an operand; an operator "Send_by_Mail" instructs that a document should be sent to an e-mail address "Tanaka@xxx.co.jp" specified by an operand; and an operator "Send_by_Fax" instructs that a document should be output to a facsimile number "029-283XXXX" specified by an operand. In addition, a plurality of processing commands can also be associated with one output area. In this case, processing such as simultaneous sending to a plurality of destinations can be automated.

Figure 22:
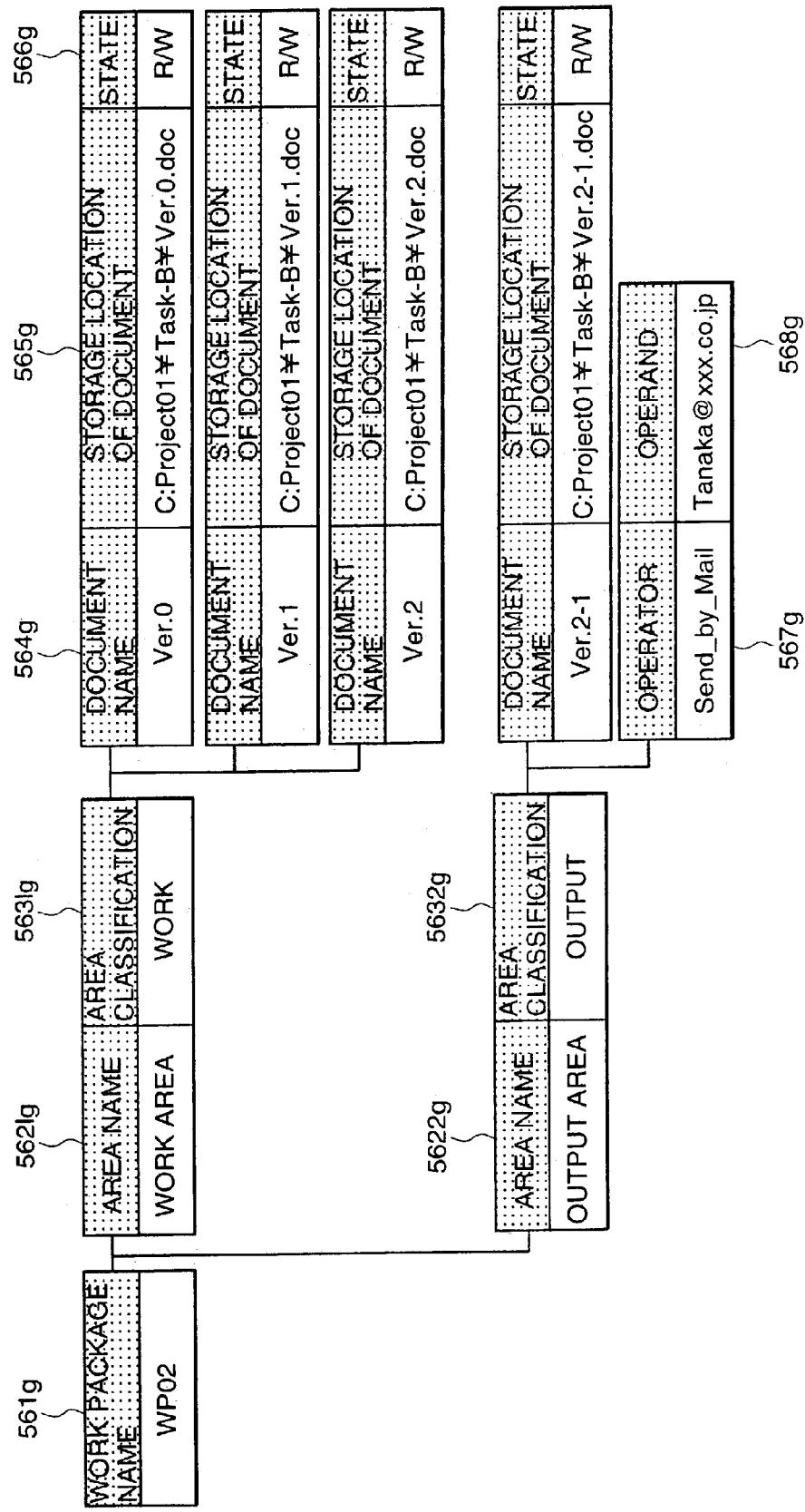
FIG. 22 is a diagram illustrating another example of work package data in the project management/support system according to the second embodiment.

FIG. 22 illustrates an embodiment of work package data (expressed differently from FIG. 4) stored in the work package database 25. FIG. 22 illustrates the data structure of a work package having a name WP02.

In the figure, a data element 561g indicates that a name of this work package is "WP02". The data element 561g is logically connected to data elements 5621g and 5622g. That is to say, WP02 has the following two areas: an area having a name "Work area", classification of which is "WORK"; and an area having a name "Output area", classification of which is "OUTPUT". The area classification indicates a function of this area, which is set by a user in advance. In this example, "WORK" indicates that a corresponding area is a work area; and "OUTPUT" indicates that a corresponding area is an area for output work.

Moreover, in a similar manner, it is found out that three document icons having names "Ver. 0", "Ver. 1", and "Ver. 2" are logically connected to "Work area"; and a document icon having a name "Ver. 2-1" is logically connected to "Output area". In this case, meanings of data items are the same as those in FIG. 4.

Moreover, an operator 567g having a value of "Send_by_Mail" and an operand 568g having a value of "Tanaka@xxx.co.jp" are logically connected to "Output area" for the purpose of association. This shows that as described in FIG. 14, the system according to the present invention automatically copies the document placed in "Output area", and then attaches the document to electronic mail before automatically transmitting the electronic mail to the e-mail address "Tanaka@xxx.co.jp".

Figure 14:
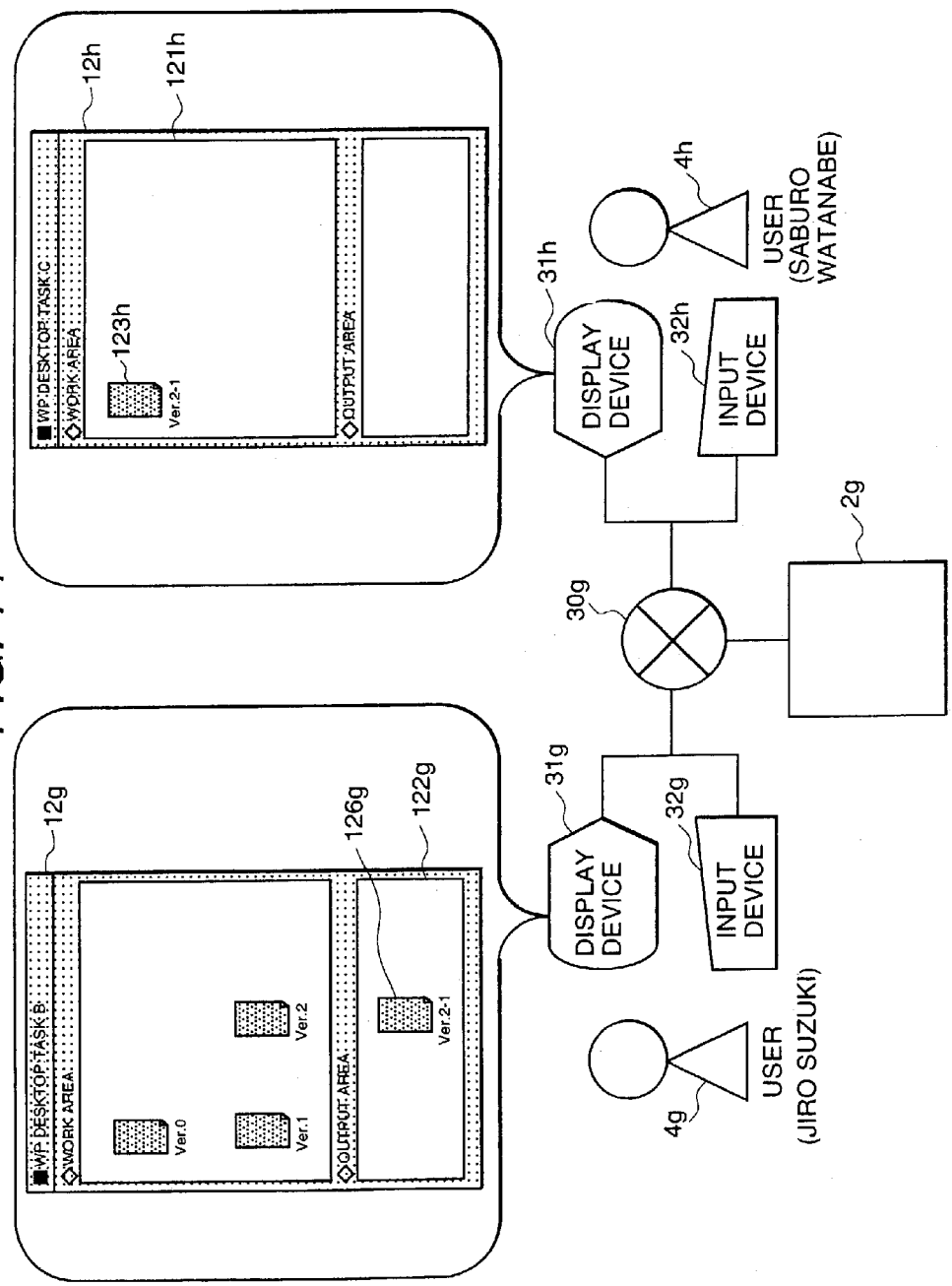
FIG. 14 is a diagram illustrating an example of association among a plurality of users in the project management/support system according to the second embodiment.

As described above, associating the processing commands as shown in FIG. 14 with the output area of the work package enables settings of various processing for the document.

Associating the processing commands with the output area of the work package enables settings of various processing for the document.

Various display areas will be described below. In the first embodiment, the work package window has only a work area and an output area. However, in some cases, when executing a task, the use of areas into which the work package window is divided on a more detailed function basis may improve usability.

Figure 16:
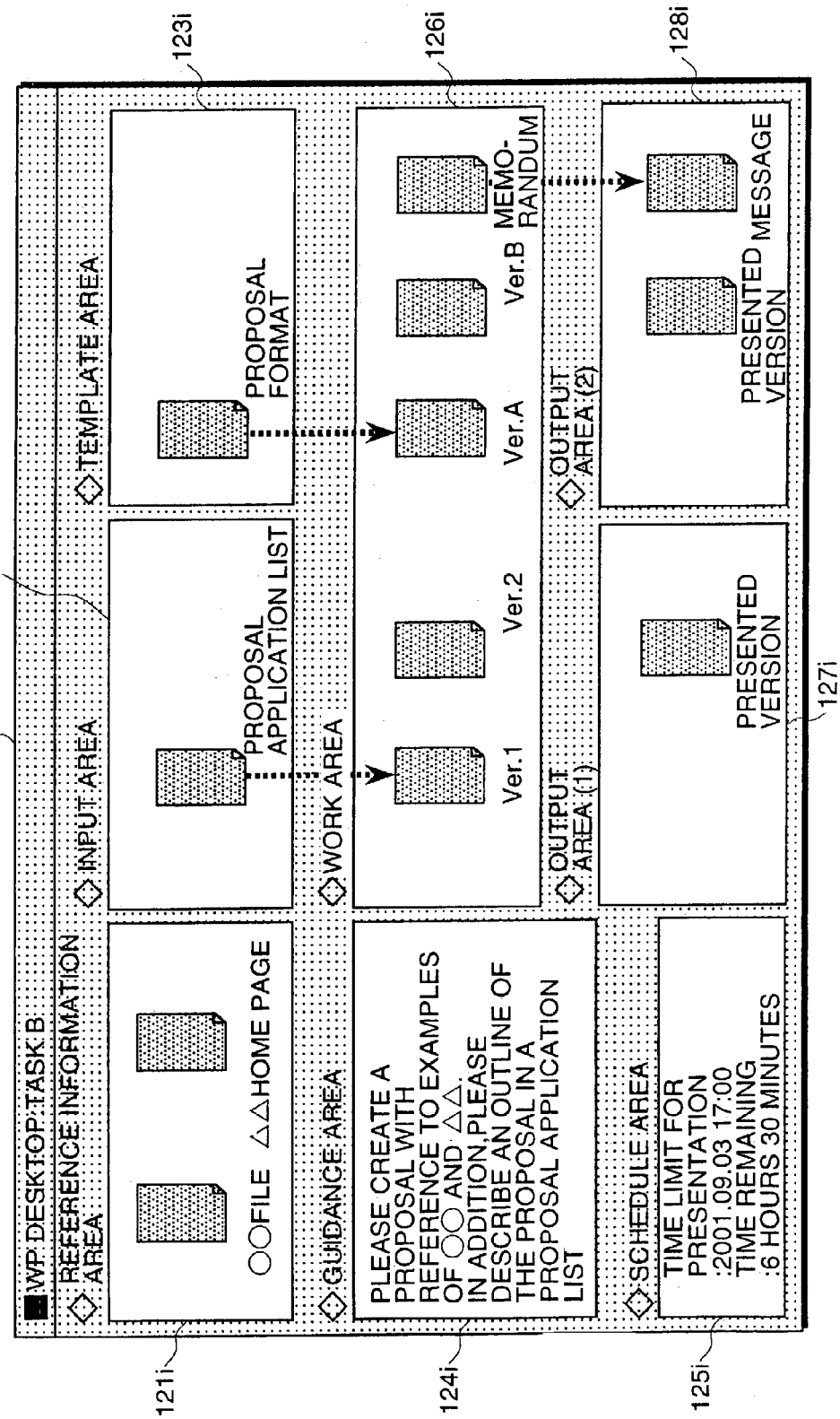
FIG. 16 is a diagram illustrating an example of a work package desktop in the project management/support system according to the second embodiment.

FIG. 16 illustrates an example of a work package window 12i having various display areas corresponding to a task for creating a certain proposal. The task performs the following operations: on the work package window 12i, with reference to the file information and home page information of a reference information area 121i, dragging and dropping a proposal application list, which has been sent to an input area 122i, and a proposal format, which has been disclosed in a template area 123i, into the work area 126i, and then edits them; and at the same time, creating a memorandum in the area; finally, outputting the documents to an output area (1) 127i and an output area (2) 128i.

In the reference information area 121i, icons corresponding to a file, an Internet home page, a database view, and the like, which are used only for reference purpose when executing this task, are displayed. In the input area 122i, icons corresponding to documents to be processed by this task, which has been sent by the other tasks, electronic mail, or the like, are displayed. To be more specific, a document in this area becomes a trigger for starting the execution of this task. In addition, in the template area 123i, icons corresponding to documents which are stored in given locations beforehand and are open to the public, such as prescribed file formats, are displayed. Entities of documents corresponding to the icons placed in the reference information area 121i and the template area 123i are stored in a storage location which is directly or indirectly associated with the area. As a result, a user can judge the following easily: whether or not a document is reference only; whether or not a document to be processed is transmitted by another task, or the like; whether or not its format is a fixed format; and the like.

Moreover, in this case, it is based on the assumption that an icon cannot be created, copied, and deleted in the three areas 121i to 123i. If the user wants to alter a document corresponding to the icon, the user should drag the icon and drop it in the work area 126i to copy it so that the user is allowed to alter the document in this work area. This prevents an original document from being altered in error by the user.

In other words, it can be said that in this embodiment, the work package desktop 12i shown in FIG. 16 is made by functionally dividing the work area 12 in FIG. 1 into the reference information area 121i, the input area 122i, the template area 123i, and the work area 126i. Therefore, these areas may also be integrated in such a manner that, for example, the reference information area 121i and the template area 123i are integrated into one display area.

A guidance area 124i is an area where steps, advice, a work flowchart, etc., which are used for executing the task, are specifically described. Displayed contents are stored while the contents are directly or indirectly associated with the task. This enables a user to understand easily what kind of operation the user should carry out in the task, and how the user should carry out the operation in the task.

In the schedule area 125i, time information relating to the task is displayed; that is to say, time limit for execution, starting time, scheduled time of completion, elapsed time, time remaining until completion, and the like, are displayed. The time information is calculated on the basis of, for example, the scheduled starting time 513, the scheduled ending time 514, of the task data 51 in FIG. 3, and current time before the time information is displayed. This enables the user to check easily time information relating to the task, which is effective in task management.

The output area 122 in FIG. 1 can be divided into a plurality of areas according to its destination. For example, the work package desktop 12i shown in FIG. 16 has two output areas. Here, a write command for writing to a shared folder can be associated with the output area (1) 127i beforehand; and a send command for sending to the next task can be associated with the output area (2) 128i beforehand. This enables the user to pass a document to a plurality of appropriate destinations easily.

A distribution as a work package will be described. In the present invention, it is also possible to encapsulate data relating to an individual task and a work package, and operation (method) for the data, so as to distribute the encapsulated data and operation as one object data.

Figure 17:
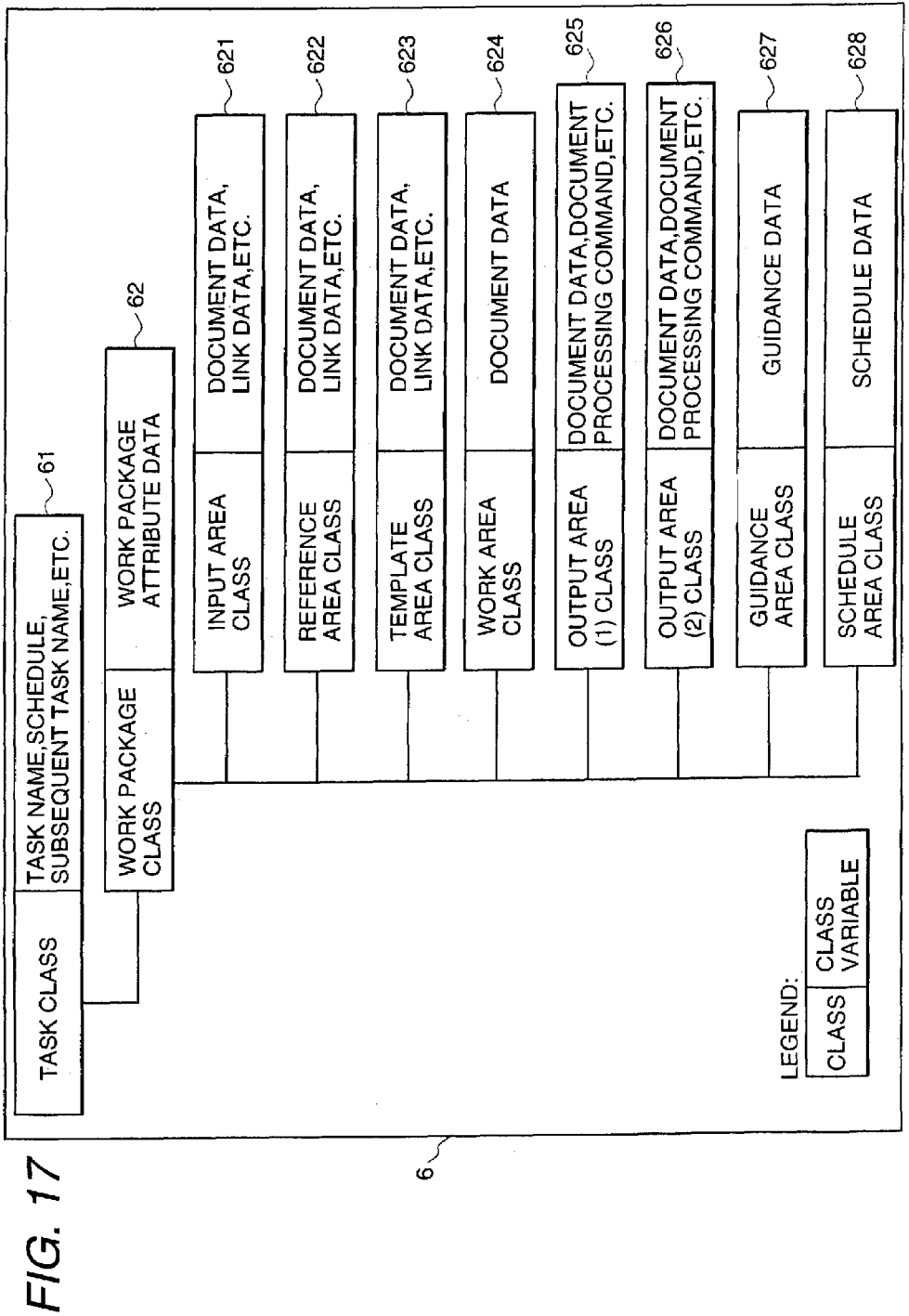
FIG. 17 is a diagram illustrating an example of a class configuration of a work package desktop in the project management/support system according to the second embodiment.

FIG. 17 illustrates an example of a class configuration corresponding to the work package desktop 12*i* shown in FIG. 16. In the figure, the task class 61 is the highest class having data peculiar to a task, such as a task name or a subsequent task name, as a class variable.

The work package class 62 encapsulates variables and operation methods relating to display attributes of the work package desktop.

An input area class 621 has at least, as a class variable, data of a document corresponding to an icon displayed in the area, or link data to an entity of the document, etc. The input area class 621 has methods relating to operation including open, and copy, of document as well as display icon.

In a similar manner, a reference area class 622 and a template area class 623 also have at least, as a class variable, data of a document corresponding to an icon displayed in each area, or link data to an entity of the document, etc. The reference area class 622 and the template area class 623 have methods relating to operation including open, and copy, of document as well as display icon.

A work area class 624 has at least, as a class variable, data of a document corresponding to an icon displayed in the area, or link data to an entity of the document, etc. The work area class 624 has methods relating to operation such as open, create, copy, edit, save, and delete, of document as well as display icon.

An output area (1) 625 class and an output area (2) 626 class have at least, as class variables, the following: data of a document corresponding to an icon displayed in the area, or link data to an entity of the document; and commands relating to document distribution processing. In addition, the output area (1) 625 class and the output area (2) 626 class have methods relating to operation including display icon and open document, and also have methods for sending a document, which has been dragged and dropped in the area, to a task, an individual, a storage location, etc. as appropriate destinations.

A guidance area class 627 has, as a class variable, guidance data for executing the task. In addition, the guidance area class 627 has a method for displaying guidance using text and diagrams to allow the operation of the guidance.

A schedule area class 628 has, as a class variable, data relating to time management of the task. In addition, the schedule area class 628 has a method for displaying the data using text and diagrams to allow the operation of the time management.

As described above, data and a method relating to a task and a work package are encapsulated in a class configuration 6 as shown in FIG. 17 and object data into which the encapsulated data and method are substantialized (instantiated) is created. This enables the following, for example: after the object data is distributed to an arbitrary user by electronic mail, the user can open this object to display the work package desktop 12*i* as shown in FIG. 15; on this display screen, the user can perform operation such as the creation of a document according to given steps; and the user can send the result of the operation automatically to a given task, an individual, a storage location, etc.

This permits a task to be distributed to an arbitrary user on a unified data (object) basis; in the unified data, data and operation that are required for executing the task are unified into one as a work package. Accordingly, instructions and allotment management of task execution, and execution management, become easy for a project manager; and since information required for the task execution is sufficiently provided, a task performer can improve efficiency in operations.

Moreover, a definition of the work package object as described above is performed by setting data as show in FIG. 22. In this case, it is desirable that definition of work package data is supported using a visual interface; for example, data structure in FIG. 22 is displayed on a computer screen so that a user can use this screen to set data. This enables the user to define a work package efficiently.

Figure 18:
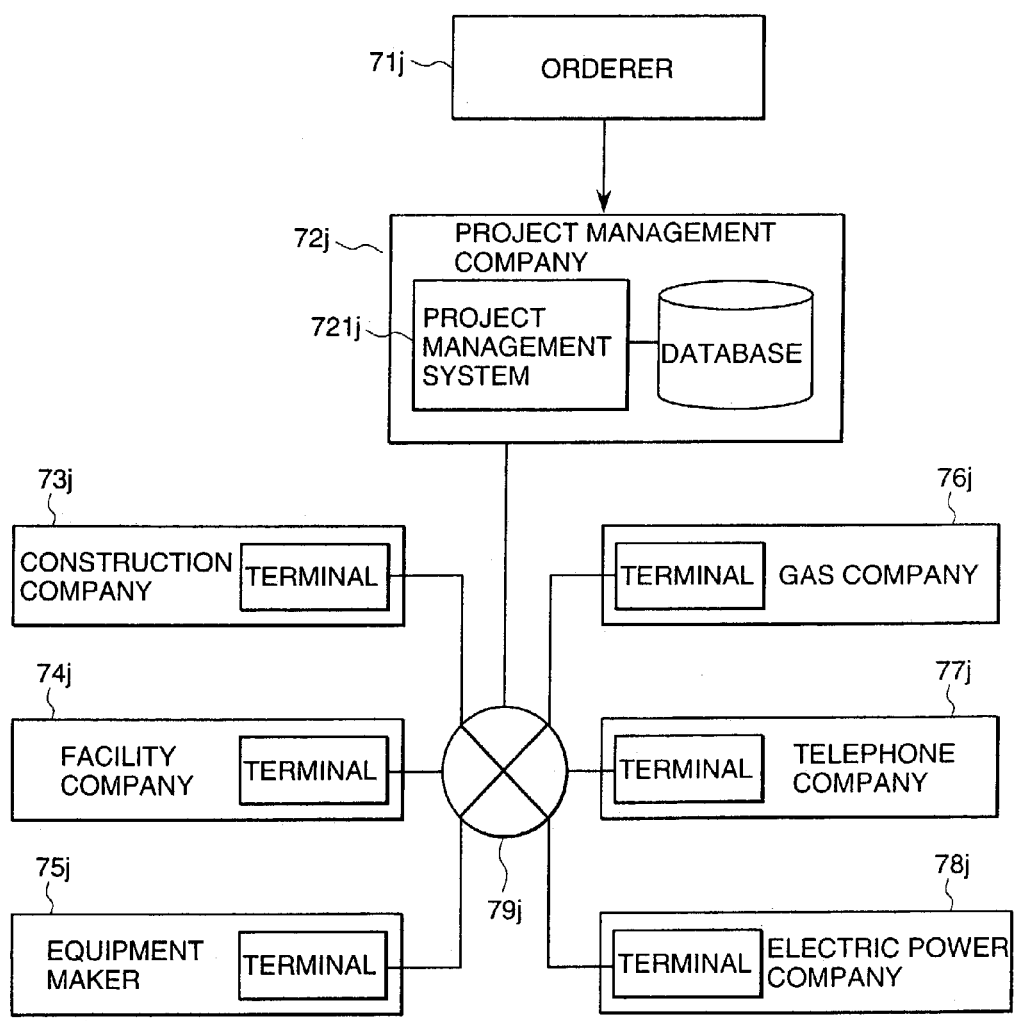
FIG. 18 is a diagram illustrating an example of a project management business model which uses a project management/support system according to a third embodiment.

A third embodiment will be described. As shown in FIG. 18, this embodiment is a business model of a project management business model which uses a project management/implementation support system.

In FIG. 18, for example, a project management company 72*j* undertakes management business of a building construction project from an orderer 71*j* of the building construction. The project management company 72*j* creates a project plan in cooperation with, for example, a construction company 73*j*. In this process, the project management company 72*j* creates task data and work package data according to the present invention, and then stores the data in a project management system 721*j* and in a DB for the purpose of management. The task and the work package are defined on a company basis; in this case, at least the companies relate to the construction project, and include a construction company 73*j*, a facility company 74*j*, an equipment maker 75*j*, a gas company 76*j*, a telephone company 77*j*, and an electric power company 78*j*.

When the project is started, each of the companies 73*j* through 78*j* relating to the project establishes a connection to a management support system 721*j* of the project management company 72*j* via a network 79*j* from a terminal possessed by each company, and then executes a task assigned to each company. The project management company 72*j* performs the following operations: managing progress using a project management/execution support system according to the present invention; reporting the progress to the orderer; and reviewing the plan as the need arises. In addition, the project management company 72*j* follows up the execution of the task if necessary. Moreover, if a task comes on unexpectedly, the project management company 72*j* creates a work package data object for executing this task, and then sends the work package data object to an appropriate company.

The project management company 72*j* receives management expenses of the project as income from the orderer 71*j* or one or more related companies 73*j* through 78*j*; or the project management company 72*j* collectively undertakes building construction from the orderer 71*j*, and entrusts the building construction to the related companies 73*j* through 78*j*. In this case, as a tender condition for the related companies 73*j* through 78*j*, the project management company 72*j* can also oblige the related companies to use this system.

Unifying management data of the project on the basis of such a business model, establishing a proper association among a plurality of tasks, and managing progress, enable both a reduction in project management costs and an increase in efficiency of the project.

Figure 19:
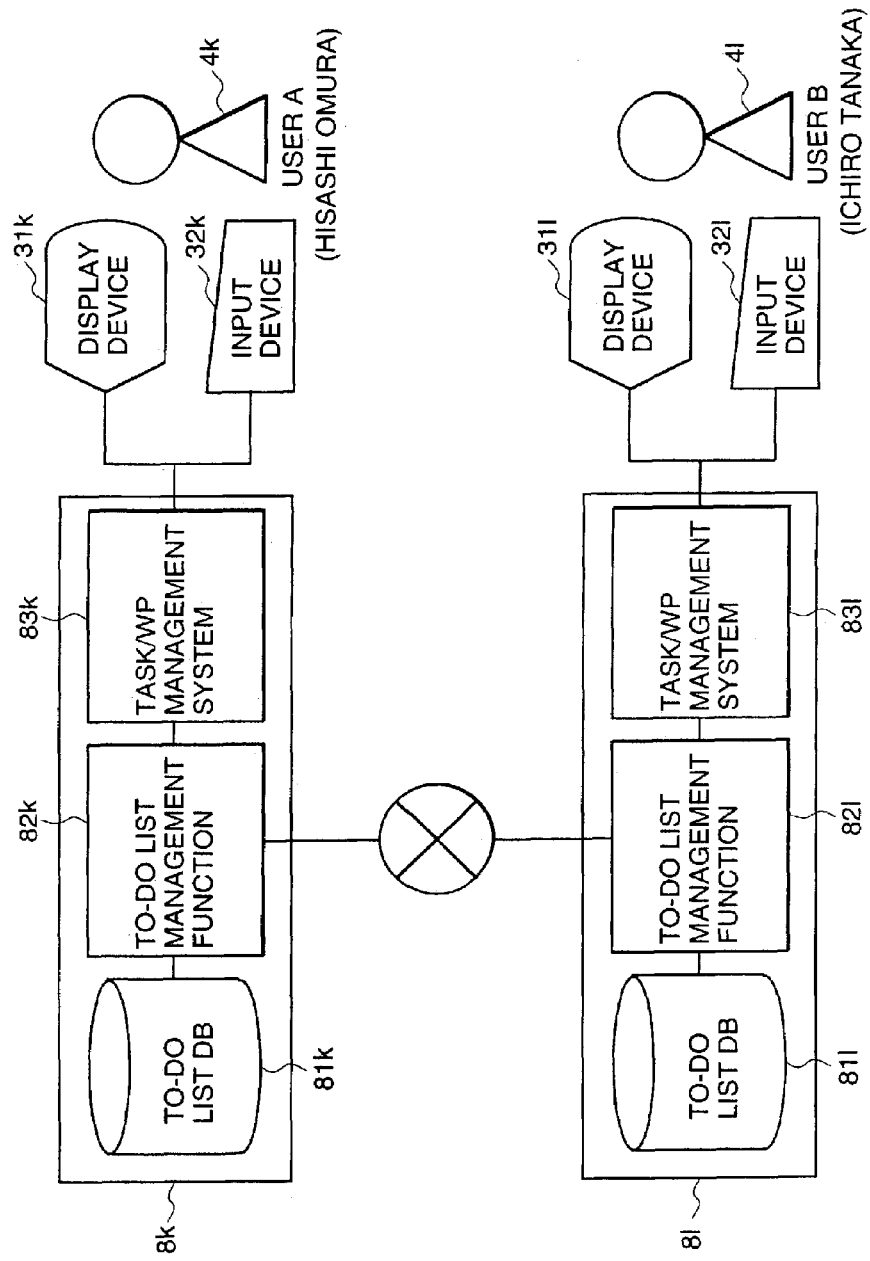
FIG. 19 is a diagram illustrating a functional configuration of a project management system according to a fourth embodiment.

A fourth embodiment will be described. In this embodiment, association with a To-Do list will be described. FIG. 19 illustrates another example of a functional configuration of a project management system according to the present invention. In this embodiment, a project management system 8*k* is configured by adding a To-Do list management function 82*k* to a task package management system 83*k* (for example, it is equivalent to reference numeral 29 in FIG. 11). The To-Do list management function 82*k* manages the following in a To-Do list form: where one or more work package data objects which have been created in the task package management system 83*k* are distributed to (or where they are distributed from); and current states of them. To-Do list data is stored in a To-Do list database 81*k*.

In the To-Do list treated here, related information including the following is described: a list of work packages which the user who uses the task package management system 83*k* distributes to another user, or which are distributed by another user; and their states of execution.

The process flow of the project management system in the present embodiment will be schematically described follows: for example, a user 4*k* uses the task package management system 83*k* to create a work package data object; and the user 4*k* distributes the work package data object to a project management system 81, which is operated by a user 41 as a performer of the work package, through the To-Do list management function 82*k* via a network 30*k*. In this case, "the source of distribution" of the work package data object is user (Hisashi Kimura) 4*k*; and "The target of distribution" is the user (Ichiro Tanaka) 41.

Next, a To-Do list management function 82*l* analyzes the contents of the work package data object distributed from the user (Hisashi Kimura) 4*k*, and then updates the To-Do list data stored in the To-Do list database 81*l*. The user (Ichiro Tanaka) 41 executes the work package distributed from the user 4*k* (Hisashi Kimura) using a task package management system 83*l*.

When a state of execution (a state, such as, not started, being executed, or completed) of the work package is changed, the state of execution is exchanged between the project management system 8*k* and the project management system 81 via the network 30*k*. Then, the project management systems update their respective managed To-Do list data.

FIG. 20 shows an example of To-Do list data stored in the To-Do list database 81*k*. The To-Do list data in FIG. 20 shows the information of a work package distributed by the user (Hisashi Omura) 4*k*. For example, the following are found out: a work package data object having a name WP012 is distributed to "Ichiro Tanaka" (user 41); distribution time is 12:22, Sep. 1, 2001; time limit of response is 17:00, Sep. 20, 2001; and a state of execution of the work package is "completed".

On the other hand, FIG. 21 illustrates an example of To-Do list data stored in the To-Do list database 81*l*. The To-Do list data in FIG. 21 shows information of a work package received by the user (Ichiro Tanaka) 41. In this figure, the following are found out: a work package data object having a name WP012 is distributed to "Hisashi Omura" (user 4*k*); distribution time is 12:22, Sep. 1, 2001; time limit of response is 17:00, Sep. 20, 2001; and a state of execution of the work package is "completed". In other words, it is possible to understand that the data of WP012 in the project management system 8*k* is synchronized with that in the project management systems 81.

In addition, in this embodiment, the source of distribution of the work package data object manages the To-Do list shown in FIG. 20; and the target of distribution manages the To-Do list shown in FIG. 21. However, providing each line (record) of the To-Do list with a flag indicating transmission or receipt enables management by a single list. Moreover, because there is a record relating to transmission and reception of WP012 in both FIG. 20 and FIG. 21, it is logically redundant. It is also possible to realize the above-mentioned function, for example, using the To-Do list only on either the transmission side or the receiving side for the whole system.

Thus, combining the project management system according to the present invention with the To-Do list management function enables all users to share information abut the following: a work package to be executed; a user who executes the work package; and a state of execution. As a result, the efficiency of work management can be improved.

As described in the above-mentioned embodiment, according to the present invention, individual task management in a project including a plurality of tasks, management of documents and related information which relates to the tasks, and the management of communication between the tasks (information exchange) can be performed synthetically. Accordingly, the management and execution of the project can be smoothly supported.

Incidentally, although the present invention is applied to the information processing apparatus for project management described in the embodiments, it is also applied to computer software used for the information processing apparatus for project management. In this case, the information processing apparatus for project management includes two functions: one displays on a screen a task area where a symbol representing a document relating to at least one task constituting a project and a symbol representing task are displayed; and the other performs document work according to an operation instruction for the symbol representing the document displayed in the task area. In addition, the task area has a work are and an output area. The computer software includes a program allowing the information processing apparatus for project management to execute the following: in the work area, a symbol representing a document of a task and a symbol representing task other than output work are displayed; and when a symbol representing a document is moved within the output area, the output area displays the symbol representing the document in a task area of another associated task constituting the project. By using the program or a recording medium, such as a CD-ROM, storing the program allowing a computer to execute the above, this computer can be used as the information processing apparatus for project management.

According to the present invention, it is possible to obtain an information processing apparatus for project management which synthetically supports management of information relating to tasks in a project and the execution of the tasks.

What is claimed is:

1. An information processing method for project management comprising steps of:
    storing data regarding names of a plurality of tasks which constitute a project and an order relationship between the tasks in the project;
    storing detail information including an associated document of one or more of the individual tasks in the project;
    displaying in a first display area a table of the plurality of tasks which constitute the project;
    receiving a user input selection of a target one of the tasks from the first display area;
    displaying a second display area corresponding to the selected target task and an icon within the second display area, wherein the icon corresponds to a document associated with the selected target task in the project;

performing document work according to a user input instruction, for the document corresponding to the icon displayed in the second display area;

identifying a succeeding task in the project, based on the order relationship between the tasks in the project;

displaying a third display area; and in response to a user input, moving the icon corresponding to the document associated with the selected target task from the second display area to the third display area, and registering the document corresponding to said icon as an associated document of the succeeding task.

2. An information processing method for project management according to claim 1, wherein the third area displays a revision history of the document corresponding to the icon, the move operation of which has been performed, and displays an associated destination.

3. An information processing method for project management according to claim 2, further comprising a step of enabling a user to open, edit, save, copy, and delete a document according to an operation instruction the document icon displayed in the second area and the output area.

4. An information processing method for project management according to claim 2, further comprising a step of creating a new document and an icon representing the new document according to a given operation instruction in the second area.

5. An information processing method for project management according to claim 2, further comprising a step of transmitting a file for a document corresponding to an icon, which has been moved to the third area, to an address, a folder, or a database, which have been specified for this area beforehand.

6. An information processing method for project management according to claim 2, wherein the second area has a reference area which displays a symbol representing a document for reference only, and a general work area which displays a symbol representing other documents.

7. An information processing method for project management according to claim 2, further comprising displaying an independent guidance area for display of guidance about execution steps of the task.

8. An information processing method for project management according to claim 2, further comprising displaying an area for display of a symbol hyperlinked to a file, a database, or a home page, which should be referred to when executing the task.

9. An information processing method for project management according to claim 2, further comprising a step of displaying a task in a project as a progress schedule chart such as a Gantt chart or an arrow diagram, where selecting an arbitrary task on the progress schedule chart permits a second area and a third area, which are associated with the task, to be displayed.

10. An information processing method for project management according to claim 2, further comprising a step of distributing a document and an icon relating to a task, data in a display area, and a function of the data operation, as unified object data.

11. An information processing method for project management according to claim 1, further comprising a step of enabling a user to open, edit, save, copy, and delete a document according to an operation instruction for icon displayed in the second area and the third area.

12. An information processing method for project management according to claim 1, further comprising offering a function of creating a new document and an icon representing the new document according to a given operation instruction in the second area.

13. An information processing method for project management according to claim 1, further comprising offering a function of transmitting a file for a document corresponding to an icon, which has been moved to the third area, to an address, a folder, or a database, which have been specified for this area beforehand.

14. An information processing method for project management according to claim 1, wherein the second area has a reference area which displays a symbol representing a document for reference only, and a general work area which displays a symbol representing other documents.

15. An information processing method for project management according to claim 1, further comprising displaying an independent guidance area for display of guidance about execution steps of the task.

16. An information processing method for project management according to claim 1, further comprising displaying an area for display of a symbol hyperlinked to a file, a database, or a home page, which should be referred to when executing the task.

17. An information processing method for project management according to claim 1, further comprising a step of displaying a task in a project as a progress schedule chart such as a Gantt chart or an arrow diagram, where selecting an arbitrary task on the progress schedule chart permits a second area and a third area, which are associated with the task, to be displayed.

18. An information processing method for project management according to claim 1, further comprising offering a function of distributing a document and an icon relating to a task, data in a display area, and a function of the data operation, as unified object data.

19. An information processing method for project management according to claim 18, further comprising a step by which when the work for the distributed object data is started, an information processing apparatus for project management, which has distributed the object data, is notified of the starting of the work.

20. A project information processing apparatus for managing project information including a plurality of tasks, comprising:

a display device for displaying a character and a graphic to a user;

an input device for accepting an input operation from the user; and a data processor for managing and processing data regarding a project, said data processor comprising:

a first memory storing data regarding names of the plurality of tasks and an order relationship between the tasks which constitute said project;

a first means for performing input and output management of data for said first memory;

a second memory storing detail information including data of an associated document of one or more individual tasks in said project;

a second means for performing input and output management of data for said second memory; and a third means responsive to a user operation input from said input device, for performing creation and updating of data and display of the data on said display device, using said first means and said second means, said third means having:

a function of displaying on a screen of said display device a first display area for displaying a table of the plurality of tasks constituting said project;

a function of specifying a target task on said table by the user using said input device;

a function of displaying second and third display areas corresponding to the target task on the screen of said display device;

a function of displaying on said second display area, an icon corresponding to an associated document of said target task;

a function of performing a user's specifying operation through said input device to initiate software required to edit the document corresponding to said icon;

a function of acquiring a succeeding task of said target task, based on the data regarding the order relationship between the tasks, which is managed by said first means; and a function of performing an operation of moving said document icon from said second display area to said third display area through user's operation of said input device to update the associated document data of the task managed by said second means and register said document corresponding to said icon as an associated document of the succeeding task.

21. A product comprising a recording medium and software carried by the recording medium, wherein execution of the software by an information processing apparatus causes the information processing apparatus to perform a number of steps in relation to management of a project comprising a plurality of project tasks, the steps performed by the information processing apparatus comprising:

storing data regarding names of a plurality of tasks which constitute a project and an order relationship between the tasks in the project;

storing detail information including an associated document of one or more of the individual tasks in the project;

displaying in a first display area a table of the plurality of tasks which constitute the project;

receiving a user input selection of a target one of the tasks from the first display area;

displaying a second display area corresponding to the selected target task and an icon within the second display area, wherein the icon corresponds to a document associated with the selected target task in the project;

performing document work according to a user input instruction, for the document corresponding to the icon displayed in the second display area;

identifying a succeeding task in the project, based on the order relationship between the tasks in the project;

displaying a third display area; and in response to a user input, moving the icon corresponding to the document associated with the selected target task from the second display area to the third display area, and registering the document corresponding to said icon as an associated document of the succeeding task.

* * * * *